United States Patent [19]

Styczinski

[11] Patent Number: 5,960,169
[45] Date of Patent: Sep. 28, 1999

[54] TRANSFORMATIONAL RAID FOR HIERARCHICAL STORAGE MANAGEMENT SYSTEM

[75] Inventor: David Alan Styczinski, Rochester, Minn.

[73] Assignee: International Business Machines Corporation, Armonk, N.Y.

[21] Appl. No.: 08/805,652

[22] Filed: Feb. 27, 1997

[51] Int. Cl.[6] .................................................. G06F 11/00
[52] U.S. Cl. ...................................... 395/182.04; 711/114
[58] Field of Search ....................... 711/114; 395/182.04, 395/182.03; 371/40.15

[56] References Cited

U.S. PATENT DOCUMENTS

| | | | |
|---|---|---|---|
| 5,148,432 | 9/1992 | Gordon et al. | 371/10.1 |
| 5,166,939 | 11/1992 | Jaffe et al. | 371/40.1 |
| 5,301,297 | 4/1994 | Menon et al. | 395/425 |
| 5,345,565 | 9/1994 | Jibbe et al. | 395/325 |
| 5,375,128 | 12/1994 | Menon et al. | 327/141 |
| 5,390,327 | 2/1995 | Lubbers et al. | 395/575 |
| 5,392,244 | 2/1995 | Jacobson et al. | 365/200 |
| 5,412,668 | 5/1995 | Dewey | 371/40.1 |
| 5,446,855 | 8/1995 | Dang et al. | 395/401 |
| 5,479,653 | 12/1995 | Jones | 395/182.03 |
| 5,596,709 | 1/1997 | Bond et al. | 395/182.05 |
| 5,666,512 | 9/1997 | Nelson et al. | 711/114 |

FOREIGN PATENT DOCUMENTS

569313A2  4/1993  European Pat. Off. .......... G06F 3/06

*Primary Examiner*—Zarni Maung
*Assistant Examiner*—David M. Ovedovitz
*Attorney, Agent, or Firm*—Roy W. Truelson

[57] ABSTRACT

A flexible array of storage devices stores a plurality of blocks divided into sets of blocks called stripes, each block of a stripe being stored on a different device. An array controller supports formatting of the stripes independently in accordance with different memory structures. Specifically, the memory structures supported in the preferred embodiment are non-redundant, mirrored, and parity protected. Each block of storage exists in one of five states: (1) EMPTY; (2) DATA; (3) PARITY; (4) COPY; or (5) FREE. Each stripe of storage blocks exists within one of seven states which depend upon the states of the blocks. Certain slate transitions are defined, permitting stripes of one type to be converted to stripes of another type while minimizing the movement of data. Specifically, a stripe in a fully mirrored state is transformed to a parity protected state by designating any one block within the mirrored stripe as a PARITY block, and changing certain status information. No movement of data is necessary in this case. It is also possible to transform a non-redundant or parity protected stripe into a mirrored stripe.

27 Claims, 15 Drawing Sheets

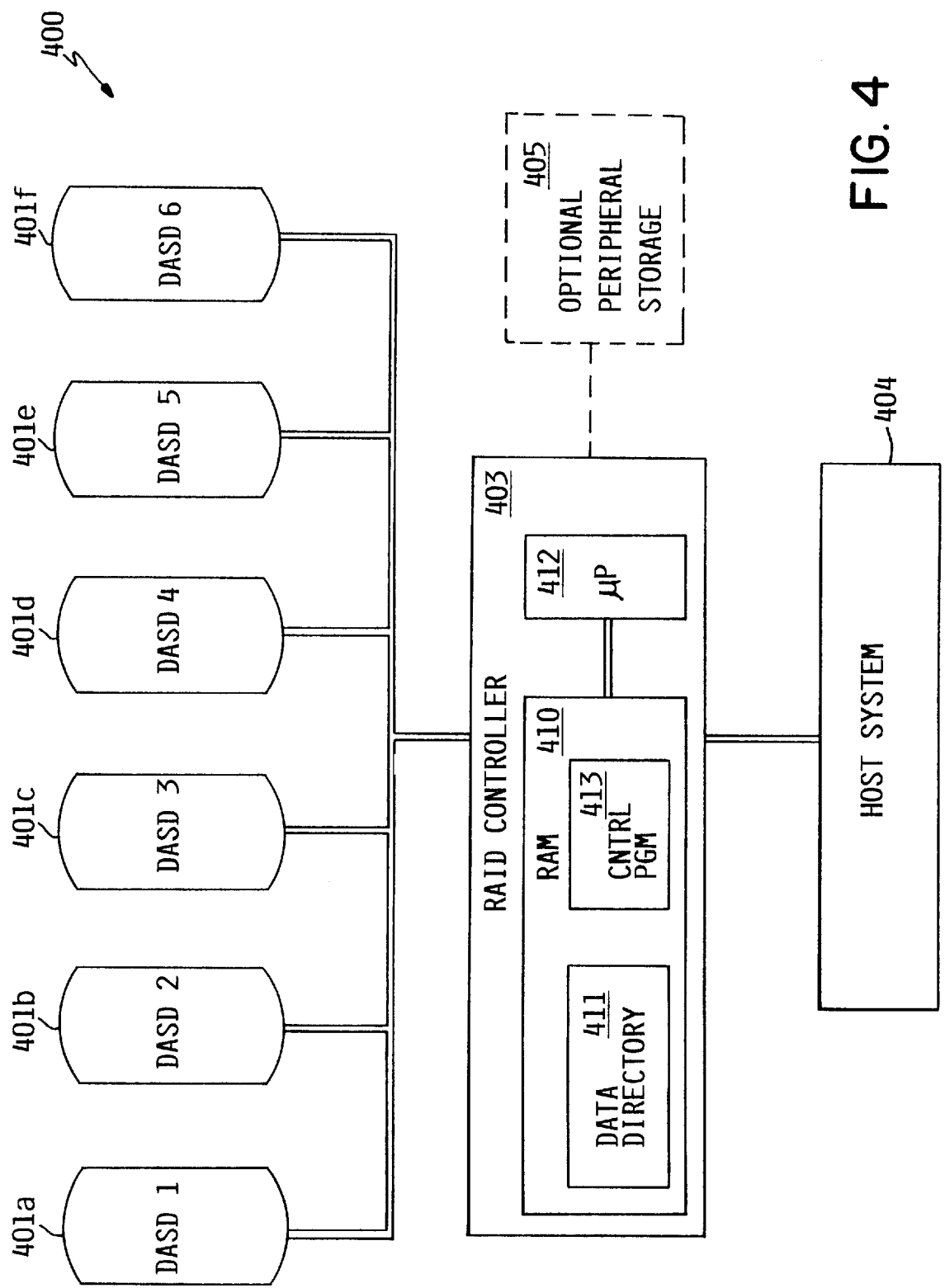

| STRIPE ID | DEV ID | STATUS | VERSION | PAIRED ID |
|---|---|---|---|---|
| STRIPE ID | DEV ID | STATUS | VERSION | PAIRED ID |
| ... | | | | |

FIG. 5B

TRANSFORMATIONAL RAID FOR HIERARCHICAL STORAGE MANAGEMENT SYSTEM

FIELD OF THE INVENTION

The present invention relates generally to digital data storage systems, and more particularly to the management of a redundant array of independent storage devices, often referred to as "RAID".

BACKGROUND OF THE INVENTION

The extensive data storage needs of modern computer systems require large capacity mass data storage devices. A common storage device is the rotating magnetic hard disk drive, a complex piece of machinery containing many parts which are susceptible to failure. A typical computer system will contain several such units. The failure of a single storage unit can be a very disruptive event for the system. Many systems are unable to operate until the defective unit is repaired or replaced, and the lost data restored.

As computer systems have become larger, faster, and more reliable, there has been a corresponding increase in need for storage capacity, speed and reliability of the storage devices. Simply adding storage units to increase storage capacity causes a corresponding increase in the probability that any one unit will fail. On the other hand, increasing the size of existing units, absent any other improvements, tends to reduce speed and does nothing to improve reliability.

Recently there has been considerable interest in arrays of direct access storage devices, configured to provide some level of data redundancy. Such arrays are commonly known as "RAIDs" (Redundant Array of Independent (or Inexpensive) Disks). Various types of RAIDs providing different forms of redundancy are described in a paper entitled "A Case for Redundant Arrays of Inexpensive Disks (RAID)", by Patterson, Gibson and Katz, presented at the ACM SIGMOD Conference, June, 1988. Patterson, et al., classify five types of RAIDs designated levels 1 through 5. The Patterson nomenclature has become standard in the industry.

The original theory of RAIDs was that a number of relatively inexpensive, small disk drives can provide the capacity of a single larger, expensive drive. The smaller drives will also be faster because they will all be reading or writing ("accessing") data at the same time. Finally, because the small drives cost so little, it is possible to include extra (redundant) disk drives which, in combination with certain storage management techniques, permit the system to recover the data stored on one of the small drives should it fail. Thus, RAIDs permit increased capacity, performance, and reliability. As RAIDs have gained acceptance in the marketplace, their use has not been limited to small capacity drives, and RAID systems are now configured with drives of all capacities. Furthermore, RAID systems may be constructed with other types of storage devices, such as optical disk drives, magnetic tape drives, floppy disk drives, etc. As used herein, the term "RAID" or "RAID system" should not be taken to be limited to any particular type of storage device.

Using the Patterson nomenclature, a RAID level 1 is a mirrored configuration. In accordance with a RAID-1 memory structure, each unit of data is stored on two independent storage devices within the array. Therefore, if one device fails, data can be recovered from the second device. FIG. 1 is an illustration of data stored in accordance with a RAID-1 memory structure. As shown in FIG. 1, the information (A, B, C, D) that is stored in Device 1 is "mirrored" in Device 2 (A', B', C', D'). Likewise, the information (E, F, G, H) that is stored in Device 3 is mirrored (E', F', G', H') in Device 4, and the information (I, J, K, L) that is stored in Device 5 is mirrored in Device 6 (I', J', K', L').

According to Patterson's nomenclature, RAID levels 3 and higher (RAID-3, RAID-4, RAID-5) employ parity records for data redundancy. Parity records are formed from the Exclusive-OR of all data records stored at a particular location on different storage units in the array. In other words, in an array of N storage units, each bit in a block of data at a particular location on a storage unit is Exclusive-ORed with every other bit at that location in a group of (N–1) storage units to produce a block of parity bits; the parity block is then stored at the same location on the remaining (Nth) storage unit. If any storage unit in the array fails, the data contained at any location on the failing unit can be regenerated by taking the Exclusive-OR of the data blocks at the same location on the remaining devices and their corresponding parity block.

In a RAID-3, all the read/write actuators on the different disk drives act in unison to access data on the same location of each drive. RAID-4 and RAID-5 are further characterized by independently operating read/write actuators in the disk drive units. In other words, each read/write head of a disk drive unit is free to access data anywhere on the disk, without regard to where other units in the array are accessing data.

In accordance with RAID-4, information is stored in "blocks", each block being stored in a different storage device. For the purpose of this document, the term "block" refers to a coherent unit of data comprising one or more sectors of data, the data being independently accessible from a single storage device. The information comprising one such RAID-4 memory structure is referred to as a "stripe". Each stripe includes a portion of the information stored in several of the devices 202a–202f of the array. For purposes of this document, the term "stripe" refers to a set of blocks, each block preferably being stored at an address that is related to the address of each other block within each other storage device, but which may alternatively comprise a set of blocks, each (or some) of which are stored at addresses which are unrelated to the addresses at which other blocks are stored within other devices. FIG. 2 illustrates four stripes of data 204a, 204b, 204c, 204d stored in accordance with RAID-4. As shown in FIG. 2, one stripe 204a includes a Data block 201 stored in Device 1, a Data block 203 stored in Device 2, a Data block 205 stored in Device 3, a Data block 207 stored in Device 4, and a Data block 209 stored in Device 5. Furthermore, one of the devices 202f is dedicated to storing "parity" information in Parity block 211. Each of the other devices store user information. If any one of the storage devices should fail, the information that was stored in the failed device can be recovered by logically exclusive ORing the remaining information of the stripe which is stored in each of the other devices.

One of the problems encountered with parity protected disk arrays having independent read/writes (i.e., RAID-4 or RAID-5) is the overhead associated with updating the parity block whenever a data block is written. For example, when information within the block 201 of Device 1 is to be changed (i.e., "new data" is written to update "old data"), the old data, the old parity information from Parity block 211, and the new data are typically XORed to produce the updated parity information. The new data and new parity are written to their respective blocks. These operations can be performed in various sequential orders, but they typically require that two blocks (both the old data and old parity) be read and two blocks (the new data and new parity) be written to every time data is updated. While the use of caches and other techniques may reduce this problem, there is a tendency for the parity disk in a RAID-4 system to become overutilized.

U.S. Pat. No. 4,761,785 to Clark et al., which is hereby incorporated by reference, describes a type of independent read/write array in which the parity blocks are distributed substantially equally among the disk storage units in the array. Patterson et al. have designated this type of array RAID-5. FIG. 3 illustrates a RAID-5 configuration. Distributing the parity blocks shares the burden of updating parity among the disks in the array on a more or less equal basis, thus avoiding potential performance bottlenecks that may arise when all parity records are maintained on a single dedicated disk drive unit, even though the same read-modify-write operation is normally used to write data in a RAID-5 system as well as in a RAID-4 system. RAID-5 is the most advanced level RAID described by Patterson.

Each of the different memory structure formats has its own characteristics, which may make it more appropriate for storage of certain data than any of the other formats. At the same time, there is no single format that is universally superior. For example, from a cost per byte of storage standpoint, RAID-1 is most expensive, parity protected RAID is less, and non-redundant storage is even less. Non-redundant storage and RAID-1 are generally faster than parity protected, due to the difficulty of updating data in a parity protected format. Both parity protected and mirrored formats are redundant, but mirrored is slightly more robust, in that even if two storage devices fail, all of the information stored on those two devices is recoverable, as long as the two devices that have failed do not have the same information stored therein. For example, referring to FIG. 1, if Device 1 and Device 3 both fail, the information that is stored in these two devices remains stored in Devices 2 and 4. Accordingly, the data within the failed storage devices can be recovered. However, in the case of a parity protected configuration, all of the data in the two devices that have failed will have been lost, since a parity protected configuration requires the information from N-1 devices to be available in order to reconstruct the information stored in one failed device, where N is the total number of devices in the RAID-4 stripe.

Because of the tradeoff that must be made between speed, robustness and required space when deciding whether to organize information in a particular configuration, it is advantageous to be able to allocate at least some of the array to be non-redundant, some to be mirrored, and some to be parity protected. Even more advantageous is the ability to dynamically allocate portions of an array to one format or another (i.e., transforming portions of the array from one format to another format and back again). Such conversions can be done by first copying all of the data from that portion of the array to be reformatted into a buffer (which may be either within or outside the array) and then reformatting that portion of the array and copying the data back in the new format. However, the process of copying the data to a buffer requires a considerable amount of overhead.

SUMMARY OF THE INVENTION

It is therefore an object of the present invention to provide an enhanced method and apparatus for storing data in a computer system.

Another object of the invention is to provide a more flexible storage subsystem for a computer system.

Another object of this invention is to provide an enhanced method and apparatus for managing a redundant array of storage devices in a computer system.

Another object of the invention is to enhance the ability of a storage subsystem of a computer system to be reconfigured to meet the needs of a user of the computer system.

Another object of the invention is to provide a system and method for efficiently transforming RAID-1 to either RAID-4 or RAID-5 and back again.

A flexible data storage apparatus comprises an array of storage devices which can be formatted to support the needs of the user. In accordance with the preferred embodiment of the present invention, each storage device within the array stores a plurality of blocks, and the storage space in the array is divided into sets of blocks called stripes. An array controller supports formatting of the stripes independently in accordance with different memory structures. Specifically, the memory structures supported in the preferred embodiment are non-redundant, mirrored, and parity protected (RAID-4 or -5). Preferably, one or more stripes of mirrored (RAID-1) information may be transformed into an equal number of stripes of either RAID-4 or RAID-5 information, or vice versa, while minimizing the movement of information.

In accordance with the preferred embodiment, each block of storage exists in one of five states: (1) EMPTY; (2) DATA; (3) PARITY; (4) COPY; or (5) FREE. Each stripe of storage blocks within the array exists within one of seven states, the seven stripe states depending upon the states of the blocks. Three of the stripe states are non-redundant, two are parity-protected, and two use mirroring. Only certain defined state transitions are possible. A block of a storage device is preferably designated as an EMPTY block when the information in that block may be changed by a RAID controller without jeopardizing user information (i.e., the information stored is neither user information, nor parity information and was not used to generate parity). A block of a storage device is preferably designated to be a DATA block when that block is preserved for storage of user information. A block of a storage device is preferably designated to be a PARITY block when the information stored therein is the result of logically exclusively ORing ("XORing") each of the DATA blocks contained within the same stripe. A block of a storage device is preferably designated to be a COPY block if the information that is stored therein is a copy of information stored in a DATA block within another device of the same stripe. A block of a storage device is preferably designated to be a FREE block if no user information is currently stored therein, but the information that is stored therein must be altered in accordance with the RAID-4 (5) read-modify-write sequence, because the information was used in determining the value of an associated PARITY block within the stripe.

In accordance with RAID-1, two copies of each block are stored; a first copy in a first storage device, and a second copy in a second device. A first copy of a block is preferably designated as a DATA block and a second copy of the block is preferably designated as a COPY block. In accordance with the preferred embodiment, while both the information in the DATA block and the information in the COPY block are stored on different storage devices, the related DATA and COPY blocks are designated as within the same stripe. Therefore, a stripe of RAID-1 information preferably includes an equal number of DATA and COPY blocks, and the number of storage devices in the array is preferably an even number. That is, each stripe may be made up of one block from each device within the array. If the number of storage devices in the array is odd, then because each DATA block requires a corresponding COPY block, either a stripe will comprise data from fewer than all of the storage devices, or there must be an odd block in each stripe.

In accordance with the preferred embodiment, a stripe in a fully mirrored state is transformed to a parity protected state (RAID-4 or -5) by designating any one block within the RAID-1 stripe as a PARITY block, and changing certain status information. No movement of data is necessary in this case.

In the case in which transformation is to be made from non-redundant or parity protected state to fully mirrored, the state tables define transition rules whereby the transformation is allowed. There must be sufficient unused space (EMPTY or FREE state) to create a COPY block associated with each DATA block within the stripe. Since both the DATA block and the associated COPY block of the RAID-1 information preferably exist within the same stripe, if information stored within the stripe to be converted (the "conversion" stripe) requires more than half the capacity of the stripe, then at least some of the information must be moved to another stripe in order to make room for the COPY block associated with the DATA block that remains. The stripes into which the information is moved ("receiving" stripes) must each have sufficient room to store both the DATA block and an associated COPY block, if the receiving stripe is configured in accordance with RAID-1. Alternatively, some of the data may be moved to a parity protected or unprotected receiving stripe, in which case, there need only be sufficient room in the receiving stripe to store the data. Copies of the DATA blocks are made and stripe status is updated.

The details of the present invention, both as to its structure and operation, can best be understood in reference to the accompanying drawings, in which like reference numerals refer to like parts, and in which:

BRIEF DESCRIPTION OF THE DRAWING

FIG. 4 is an illustration of a RAID system in accordance with the preferred embodiment of the present invention;

Figures 5A, 5B and 5C depict data structures used to map the status and usage of data blocks in accordance with the preferred embodiment;

DETAILED DESCRIPTION OF THE PREFERRED EMBODIMENT

Figure 1:
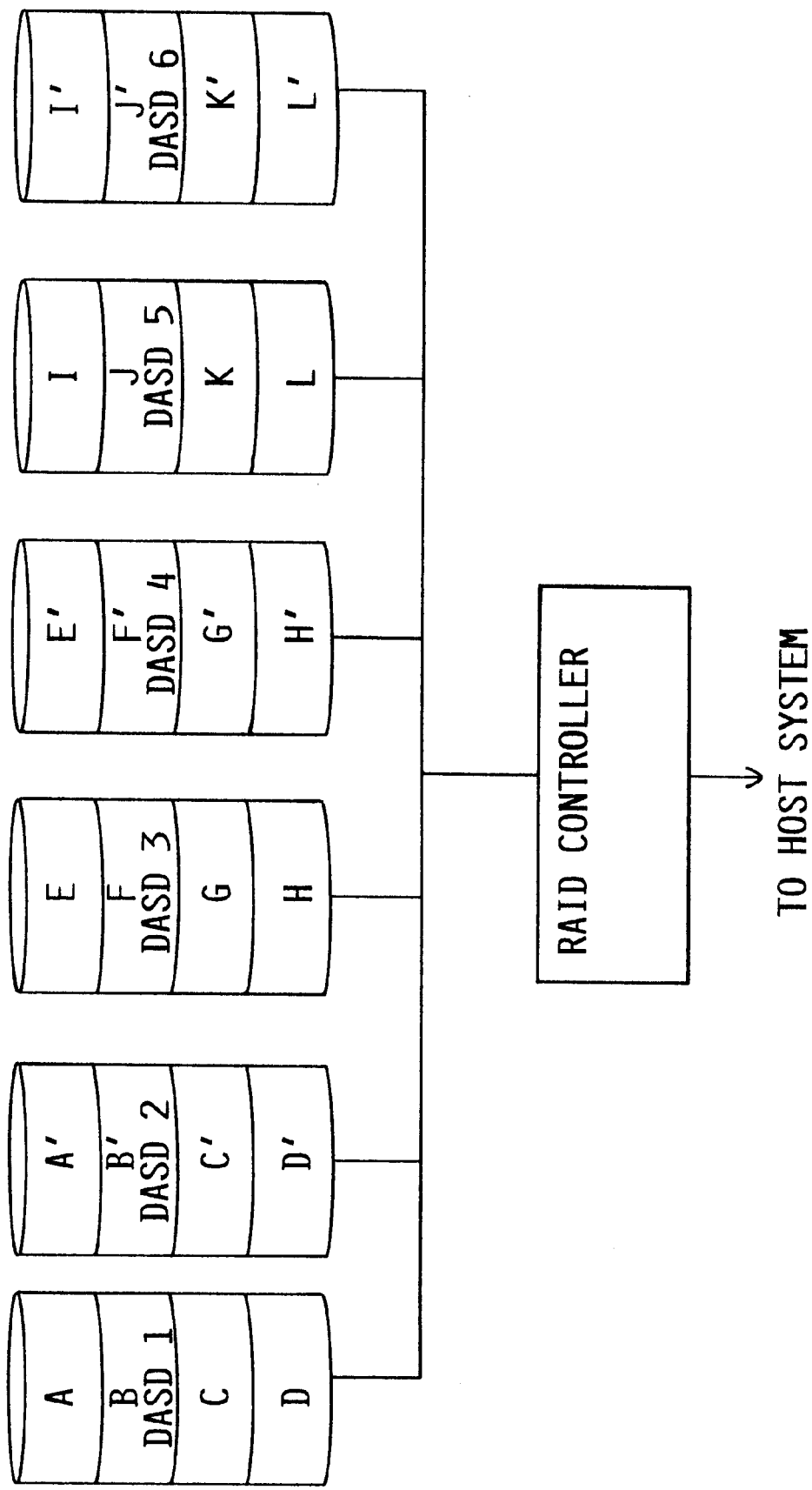
FIG. 1 is an illustration of data stored in accordance with a prior art RAID-1 structure.
Figure 2:
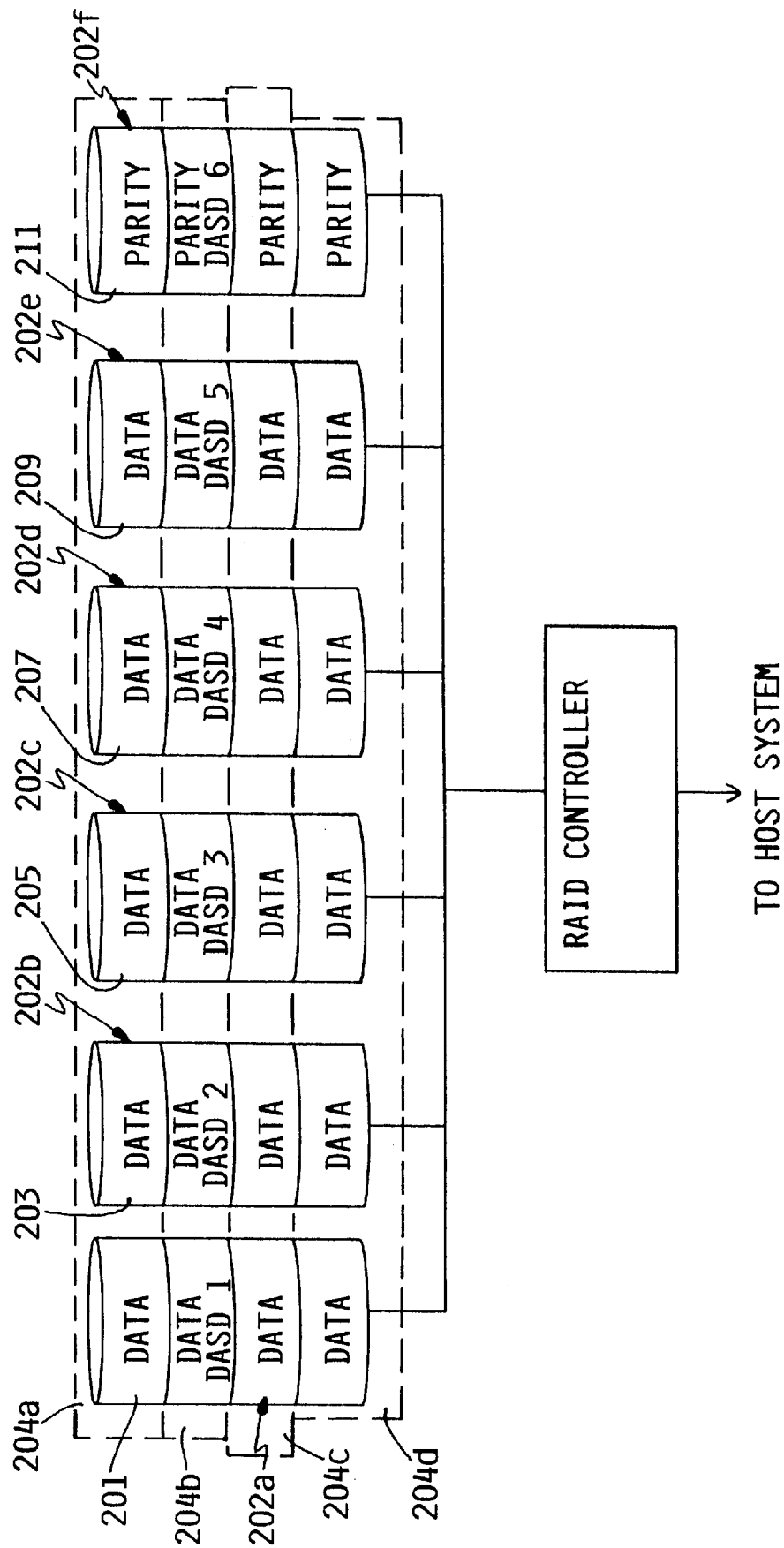
FIG. 2 illustrates data stored in accordance with prior art RAID-4.
Figure 3:
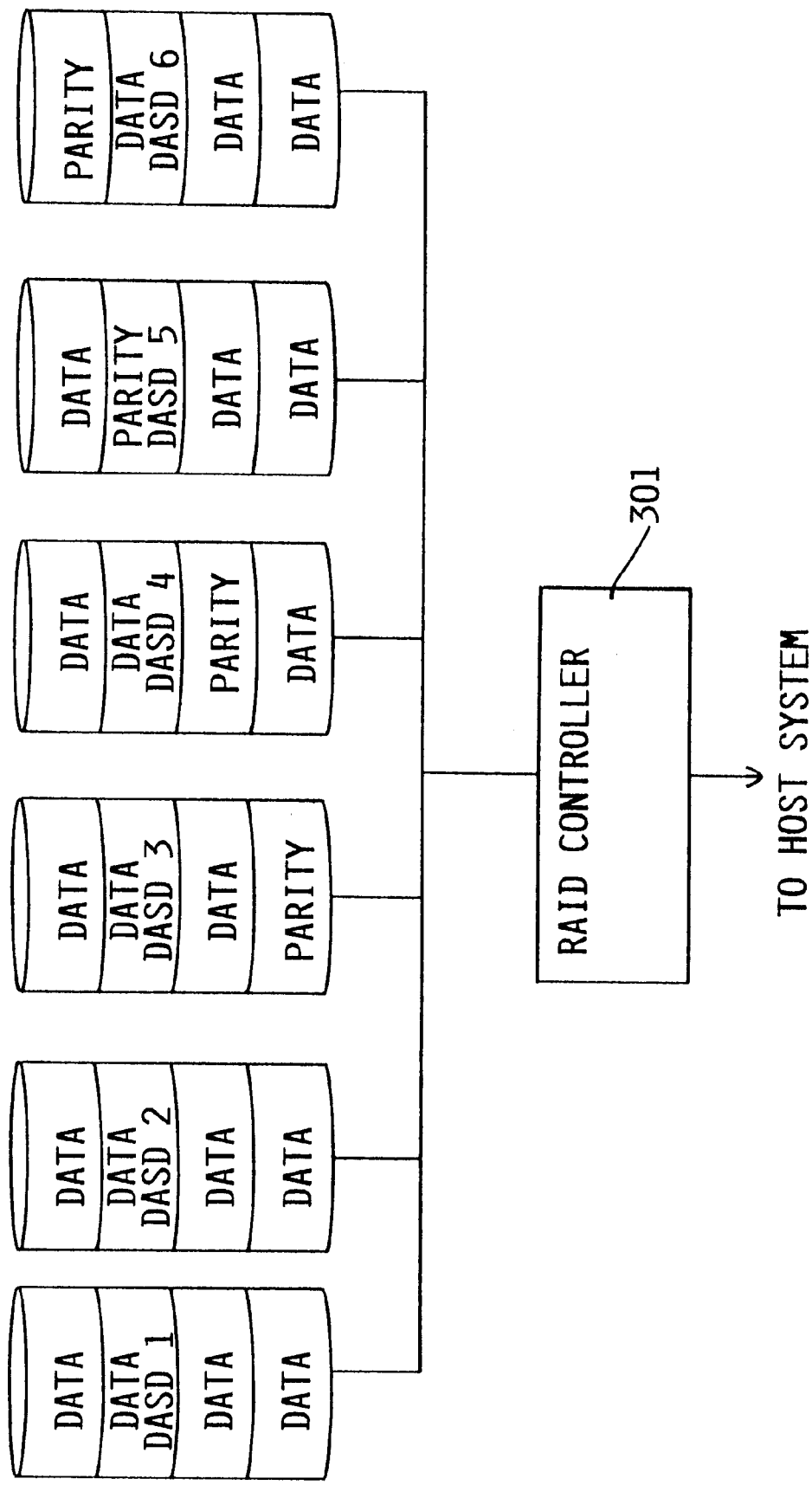
FIG. 3 illustrates data stored in accordance with prior art RAID-5.

Referring initially to FIG. 4, a reconfigurable RAID storage system in accordance with the preferred embodiment of the present invention is shown. As is the case in a conventional RAID configuration, the RAID system 400 of the preferred embodiment includes a plurality of storage devices 401a–401f. In the preferred embodiment, storage devices 401a–401f are direct access storage devices (DASD), specifically, rotating magnetic hard disk drive storage devices, it being understood that other types of storage devices could alternatively be used. It should be understood that while 6 DASDs are shown for convenience in FIG. 4, an array in accordance with the present invention may comprise three or more devices. A RAID controller 403 is coupled to the DASDs 401a–401f. In accordance with one embodiment of the present invention, the RAID controller 403 includes random access memory 410 and programmable microprocessor 412. Some or all of memory 410 may be non-volatile, to further reduce the probability of data loss. Processor 412 executes a control program 413 which controls the operation of the array, specifically, the conversion of sets of storage devices from one format to another in accordance with the methods described herein. Control program 413 is shown residing in memory 412, it being understood that it could alternatively reside in a separate control store memory, such as a read-only memory (ROM) chip. Control program may be loaded to memory 412 from an optional separate peripheral device such as a magnetic floppy disk, magnetic tape, optical disk, etc., or may be downloaded from host system 404. Controller 403 preferably receives commands and information from host system 404. The host system 404 may be any device which can be coupled to a conventional RAID system, including a programmed general purpose digital computer. The commands instruct controller 403 to store in the array of DASDs information received in connection with the command. In addition, the commands may indicate whether the information is to be stored in accordance with a non-redundant or a RAID-1, -4, or -5 format. Alternatively, the controller 403 determines without guidance from the host processor whether information received is to be stored non-redundantly or in accordance with RAID-1, -4, or -5.

The controller 403 may be coupled to the array of DASDs by a single bus. However, in the preferred embodiment, connections which allow data to be transmitted to more than one DASD at a time are provided. In accordance with an optional embodiment of the present invention, optional peripheral storage 405, such as a tape array, is also coupled to the controller 403. A tape array allows the controller to move infrequently used information out of the DASD array in order to free space within the DASDs of the array.

Optionally, peripheral storage 405 can be a DASD used as a temporary cache for data being written, as described in commonly assigned co-pending application Ser. No. 07/879, 621 to David A. Styczinski, entitled "Method and Apparatus for Operating An Array of Storage Devices", filed May 6, 1992, herein incorporated by reference.

In the preferred embodiment of the present invention, either a RAID-4 or RAID-5 format are used, but not both. However, in an alternative embodiment, the controller 403 may be capable of storing information in accordance with either RAID-1, -4, or -5. It will be understood by those skilled in the art that the controller 403 must know which portion of the array is allocated to each configuration. For example, if a portion of the array is allocated to storing information in accordance with RAID-1 and a portion of the array is allocated to storing information in accordance with RAID-5, the controller 405 must be aware of which portions are allocated to which formats.

Data directory 411 in memory 410 records how different portions of the array are used. Data directory 411 stores the current status of the blocks within the array, i.e, whether each block is a DATA, COPY, PARITY, EMPTY or FREE block, and the form of data redundancy for each stripe (mirrored, parity protected, or non-redundant). Data directory 411 may store additional information as well as required to determine the usage of the various portions of the array. In order to enable recovery in the event of loss of power or loss of a component, it is preferable that a redundant copy (not shown) of data directory 411 exist elsewhere (e.g., on a designated place on one of the DASDs, or on separate peripheral device 406), and/or that data directory 411 be stored in a non-volatile portion of RAM 410.

Figure 5A:
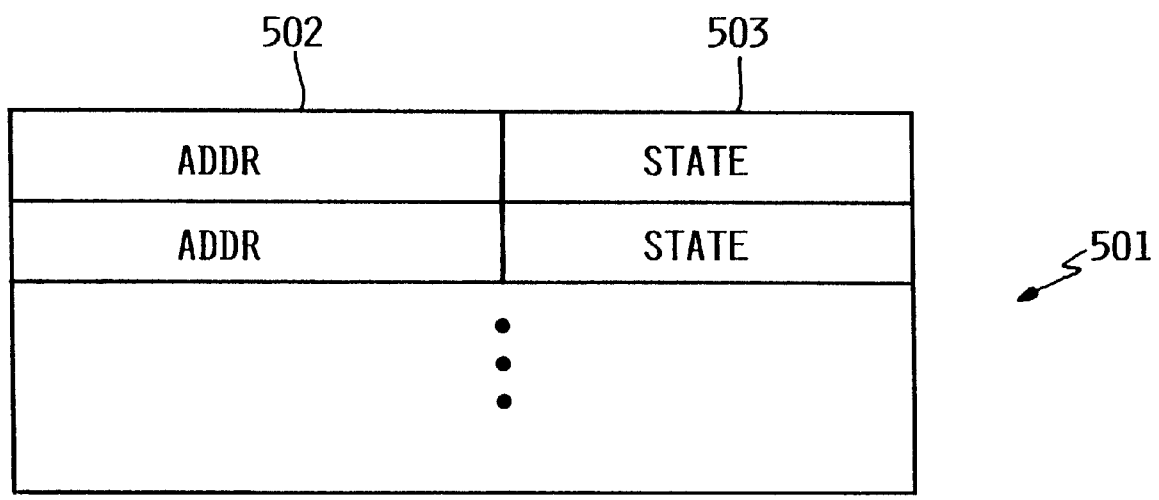
Figure 5C:
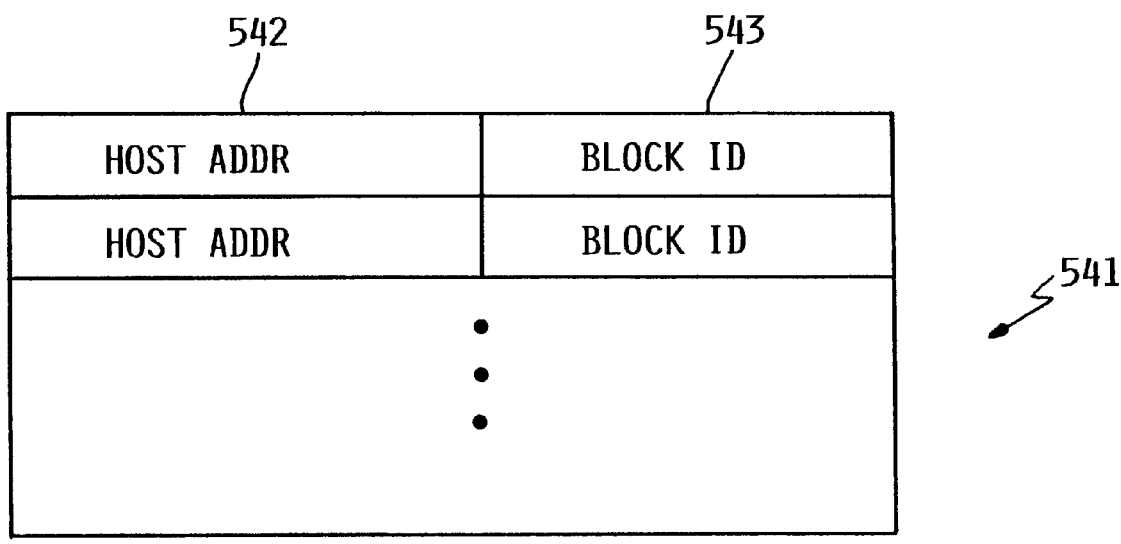

FIGS. 5A 5B and 5C illustrate three of the data structures within data directory 411 used for the aforementioned purposes, according to the preferred embodiment. FIG. 5A shows a stripe state table, FIG. 5B shows a block status table, and FIG. 5C shows a host address mapping table. Stripe state table 501 contains a plurality of entries, each entry containing a stripe address field 502 and a stripe state field 503. Stripe address field 502 stores the starting address of the blocks of the stripe on the storage devices. In the preferred embodiment, all blocks are of the same size, and all blocks of a stripe at the same address within each respective storage device; hence the identification of a single starting address is sufficient to identify the stripe. Stripe state field 503 contains the current state of the stripe; the possible states are explained in greater detail below with reference to FIG. 6.

Block status table 521 contains a plurality of entries, one entry for each block. Each entry in block status table 521 contains stripe identifier field 523, device ID field 524, status field 525, version number field 526, and paired device field 527. Stripe ID field 523 identifies the stripe in which the block is contained, and may, e.g., be a pointer to the corresponding entry in stripe state table 501. Device ID field 524 contains an identifier of the DASD containing the block. Because each stripe contains no more than one block from any one DASD, the specification of stripe and DASD is sufficient to specify any block. Status field 525 records the usage status (DATA, COPY, PARITY, FREE or EMPTY) of the block. Version number field 526 records a version number. Version numbers are incremented with each data update, and are used to determine whether redundant blocks are synchronized. Paired device field 527 identifies the paired block for a mirrored block of storage, or the parity block for a parity-protected data block. Paired device field may e.g., be a pointer to the block status map table entry corresponding to the paired/parity block, or may be a device identifier.

Host address mapping table 541 maps host addresses to blocks. In accordance with the preferred embodiment, a host computer system views the storage subsystem as a single large range of addresses. A command from the host to read or write to a particular address must be translated to refer to a storage device ID and address within the storage device, which is accomplished with the host address mapping table 541. Mapping table 541 contains a plurality of entries, one for each block addressed by the host system. Each entry contains a host system address field 542, and a block identifier field 543, the block identifier field containing a pointer to an entry in block table 521 which identifies the block.

It will be understood that the above described data structures are illustrative of a single embodiment only, and that many variations of data structures are possible. For example, it would be possible for a host computer system to track physical location of blocks, making a host address mapping table in RAID controller 403 unnecessary. The data structures could be constructed as one large table, as linked lists, or in various other forms. Furthermore, depending on the exact form of the implementation, some field may be unnecessary, or additional fields may be required. It will further be understood that the data structures described above are not necessarily the only data structures used by RAID controller 403. For example, controller 403 will preferably have a list of free space available for allocation on storage devices; this could include not only blocks having FREE or EMPTY status, but as yet unallocated portions of DATA blocks.

In normal operation, controller 403 responds to data access commands (read or write data) received from host computer system 404. A data access command from host 404 will contain an address of a block (or portion thereof, such as a sector) to be read. The address from the host is used to access an entry in host address mapping table 541. Block identifier field 543 points to the entry in block table 521 corresponding to the desired block. Controller accesses this entry to obtain a storage device identifier from field 524 and a stripe identifier from field 523. These identify the block to be read. Controller 403 then issues a read command to the appropriate storage device, passing the address of the desired data within the storage device.

Figure 6:
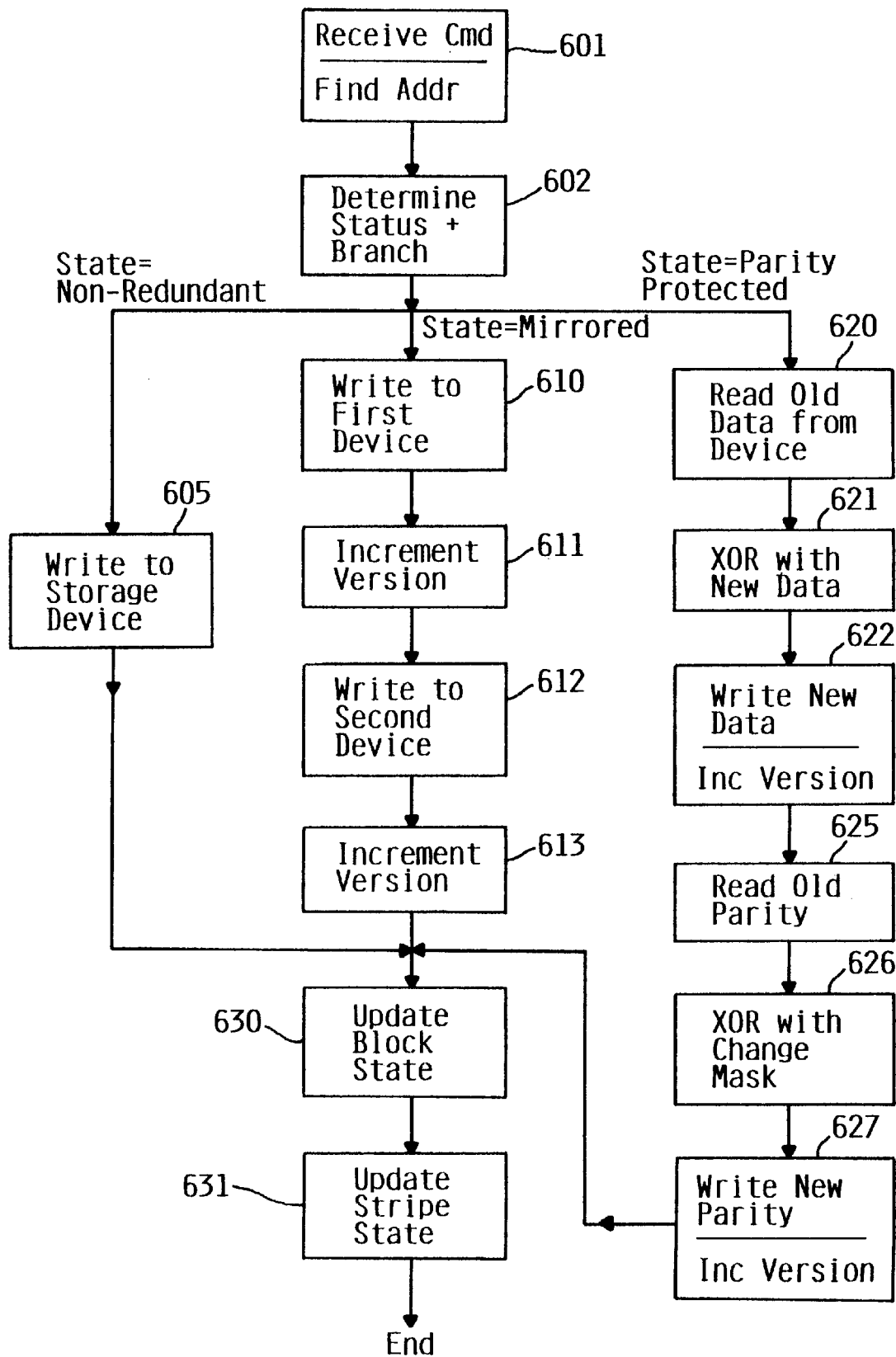
FIG. 6 is a flowchart of the steps performed to write data to a storage device attached to a RAID controller in accordance with the preferred embodiment.

The write operation is more complicated, because (a) controller 403 must ascertain the current block usage, and (b) a write operation may cause a change of stripe state. FIG. 6 is a flowchart of the steps performed by RAID controller 403 in performing a write operation. In response to a write command from host 404, controller 403 consults tables 501, 521 and 541 to determine the storage device ID and address of the desired block as described above for the read operation (STEP 601). Additionally, controller determines the current status of the stripe from stripe state field 503 of table 501 (STEP 602).

The possible states and state transitions are described more fully below with respect to FIG. 7. Depending on the current state of the stripe, one of three possible branches is taken. If the current state is any of the unprotected states (Nos. 5, 6 and 7), controller 403 simply issues a write command to the appropriate storage device, passing the address at which the data should be written within the storage device (STEP 605).

If the current state is either of the mirrored states (Nos. 1 and 2), controller 403 first issues a write command to the appropriate storage device containing the mirrored data (STEP 610). Controller 403 then increments version number field 526 for the block containing the mirrored data (STEP 611). Controller 403 then finds the device ID of the device containing a copy of the mirrored data from paired device field 527, and issues a write command to the storage device containing the copy (STEP 612). Upon completion, the version number field 526 for the block containing the copy is incremented to equal the version number of the block containing the original data (STEP 613).

If the current state is either of the parity protected states (Nos. 3 and 4), controller 403 first reads the data from the storage device containing the data (STEP 620), exclusive-ORs this data with the new data to be written to generate a temporary change mask (STEP 621), writes the new data to the storage device and increments the version number field (STEP 622). Controller 403 then obtains the identity of the device containing parity from paired device field 527, reads the old parity block from the parity device (STEP 625), exclusive-ORs this old parity data with the change mask to generate the new parity data (STEP 626), writes the new data to the parity block (STEP 627), and increments the version number field of the parity block.

Controller 403 then determines whether any change in the state of a block has taken place. I.e., if data has been written to a block having a status of either FREE or EMPTY, the status must be changed to DATA (STEP 630). If a block's status has changed, it is also possible that the state of the stripe has changed. Controller therefore determines whether a change has taken place in the state of the stripe, and updates the state field 503 to reflect the change (STEP 631). The possible changes and events which trigger them are described below with respect to FIG. 7.

It should be understood that the description of read and write operations above and in FIG. 6 has been simplified for ease of understanding, and that additional operations not critical to an understanding of the present invention may be performed with a read or write. In particular, controller 403 may have a resident cache memory for improving performance, and that in this case the contents of the cache would normally be checked before reading from and/or writing to a storage device. Alternatively, controller 403 may employ an external logging device for temporarily caching write operations.

In addition to being able to store received information in either RAID-1,-4, or -5 format, the controller 403 of the preferred embodiment is capable of reallocating the array such that portions of the array in which information is already stored in accordance with one RAID format, may be reallocated to another RAID format. For example, a portion of the array which is allocated to storing information in accordance with RAID-1 can be reallocated to store information in accordance with RAID-5. The information that is stored in that portion of the array will then be reformatted in accordance with RAID-5.

In order to support conversion of a portion of the array from one RAID format to another, a state (stored in table 501) is associated with each stripe, and a defined set of state changes are permitted in response to pre-defined events. Generally, the events which cause state changes are certain data write operations, certain requests to free space (i.e., data in an existing block will be discarded), and requests to change the RAID format of the stripe. FIG. 7 is a state diagram showing the available states, and possible state changes.

Seven states are defined, as follows:
1. NEW MIRROR: This state implies that data written to the stripe will also have a mirrored copy written to the stripe. However, at least one block in this stripe is EMPTY.
2. FULL MIRROR: This state implies that all the data in the stripe is mirrored and that no EMPTY block exists for this stripe.
3. PARITY X: This state implies that the data is parity protected (e.g., RAID-4 or RAID-5), but that there are enough FREE and PARITY blocks to hold copies of all the DATA space.
4. FULL PARITY: This state implies that the data is parity protected and that there are not enough FREE and PARITY blocks to hold copies of all the DATA blocks.
5. UNPROTECTED X: This state implies that the data is unprotected but there are enough EMPTY blocks for copies of all the DATA blocks.
6. UNPROTECTED: This state implies that the data is unprotected, that there are not enough EMPTY blocks for copies of all the DATA blocks, but there is an EMPTY block for a parity block.
7. FULL UNPROTECTED: This state implies that the data is unprotected and no EMPTY blocks exist.

Figure 7:
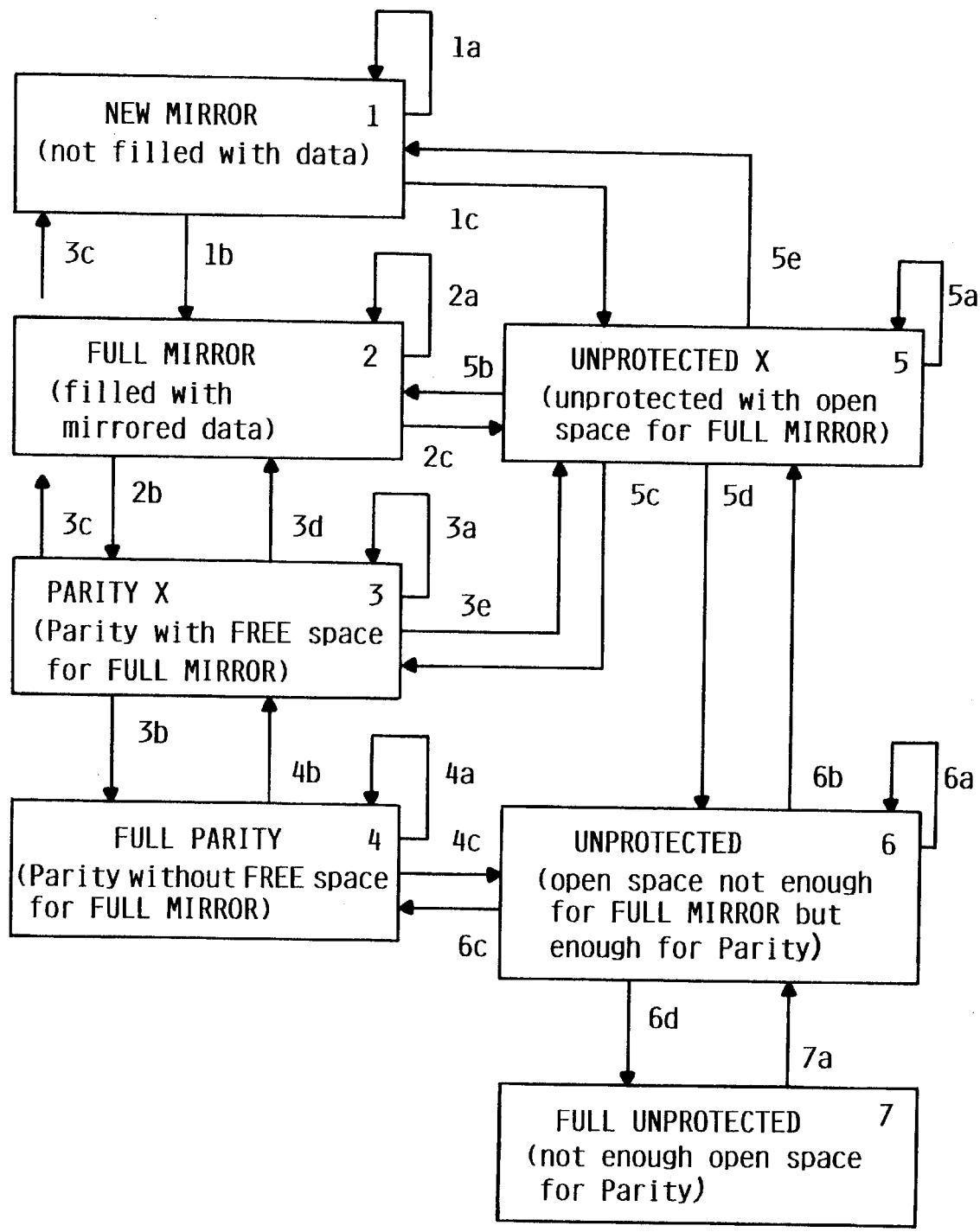
FIG. 7 is a state diagram showing possible state changes in a stripe of data blocks in accordance with the preferred embodiment.

The following state transitions as shown in FIG. 7 are possible:
1a This transition occurs when data is written but there is still at least one EMPTY block in the stripe.
1b This transition occurs when, as a result of a write operation, there is no longer an EMPTY block in this stripe (i.e., data was written to the last EMPTY block, which now becomes a DATA block). This change could also occur on command to change stripe format to parity protected, as part of a two-stage transition (from state 1 to state 2 to state 3), as described more fully below with respect to FIG. 8; in this case, EMPTY blocks are paired in copies and their status changes to FREE.
1c This transition occurs only on command to change the stripe format, e.g., to create more space for storing data. In this transition, all blocks of the stripe having COPY status are changed to EMPTY status.
2a This transition occurs when data is written to a pair of FREE blocks (causing a status change to DATA and COPY). It also occurs on command to free the space within a block. In the latter case, both copies of the block are designated FREE (indicating available for use) but mirroring is not disrupted.
2b This transition occurs only on command to change stripe format. The procedure for this state change is described more fully below with respect to FIG. 8.
2c This transition occurs only on command to change stripe format. In this transition, all COPY blocks are changed to EMPTY status.
3a This transition occurs when data is written to a FREE, block, causing a status change to DATA (except in circumstances described in 3b below). It also occurs on command to free the space within a DATA block, causing the block to change state to FREE.
3b This transition occurs when data is written to a FREE block, causing a status change to DATA, and as a result there are no longer enough remaining FREE and PARITY blocks to copy all the DATA blocks in the stripe.
3c This transition occurs only on command to change stripe format. The procedure for this state change is described more fully below with respect to FIG. 11.
3d This transition occurs only on command to change stripe format. The procedure for this state change is described more fully below with respect to FIG. 11.
3e This transition occurs only on command to change stripe format. All PARITY and FREE blocks are changed to EMPTY, making them available for storage of additional data.

4a This transition occurs when data is written to a FREE block, or when a command to free space within a DATA block causes the block to change to FREE, but there are still not enough FREE and PARITY blocks in the stripe to hold copies of all the DATA blocks (enabling a transition to a mirrored state).

4b This transition occurs after a DATA block is changed to FREE, and as a result there are now enough FREE and PARITY blocks to hold copies of all the DATA blocks.

4c This transition occurs only on command to change stripe format. All PARITY and FREE blocks are changed to EMPTY.

5a This transition occurs when data is written to an EMPTY block, causing it to change status to DATA, or when a command to free space within a DATA block causes the block to change from DATA to EMPTY, and after either change, there are enough EMPTY blocks to hold copies of all the DATA blocks (enabling a transition to the mirrored state).

5b This transition occurs only on command to change stripe format, as explained more fully below.

5c This transition occurs only on command to change stripe format, as explained more fully below.

5d The transition occurs when data is written to an EMPTY block, causing the EMPTY block to change status to DATA, and as a result of the change there are no longer enough EMPTY blocks in the stripe to hold copies of all the DATA space.

5e This transition occurs only on command to change stripe format, as explained more fully below.

6a This transition occurs if data is written to an EMPTY block, causing it to change status to DATA, or when a command to free space within a DATA block causes the block to change from DATA to EMPTY, and after either change, there is an EMPTY block for parity but not enough EMPTY blocks to hold copies of all the DATA blocks.

6b This transition occurs if a command to free space within a DATA block causes the block to change from DATA to EMPTY, and as a result there are now enough EMPTY blocks to hold copies of all the DATA blocks.

6c This transition occurs only on command to change stripe format, as explained more fully below.

6d This transition occurs when data is written to the last EMPTY block, causing it to change status to DATA, so that there are no more EMPTY blocks.

7a This transition occurs when a command to free space within a DATA block causes the block to change from DATA to EMPTY.

As described above, certain transitions occur "on command" to change stripe format. Preferably, controller 403 configures stripes in accordance with commands from host 404. Host does not record the configuration of individual stripes, but only knows that a certain quantity of storage exists in a mirrored configuration, a certain quantity in a parity protected configuration, and a certain quantity in an unprotected (i.e., not redundant) configuration. Controller 403 responds to initial configuration commands from host 404 by allocating the appropriate number of stripes for each respective configuration. Thereafter, whenever host 404 writes new data, it specifies whether the data is to be mirrored, parity protected, or unprotected. Controller 403 selects an appropriate stripe and block based on this specification. Host 404 may change the configuration, e.g., to free up more space, or because it finds it needs more space of a different configuration. In this case, host 404 will send a configuration command to controller 403, requesting some amount of storage (number of stripes) be reconfigured. Controller selects an appropriate stripe for reconfiguration based on the current state of the stripes. Preferably, controller 403 selects the stripe which has the least amount of data already in it. For example, if a command is received from host 404 to convert a stripe from unprotected status to parity protected status: transition 5(c) is preferred over 6(c); as between multiple stripes in the same state, the stripe having the largest number of EMPTY blocks is preferred; and as between stripes having an equal number of EMPTY blocks, the stripe with the most unused space within partially full DATA blocks is preferred (assuming portions of blocks can be allocated).

It should be understood host 404 could alternatively map blocks to devices and addresses, and determine (with or without user input) which stripes are to be configured in which manner. In this case, controller 403 would simply respond to host commands to change the configuration of a stripe. Alternatively, controller 403 could determine on its own to change the configuration in accordance with some pre-determined algorithm or conditions. As another alternative, a user might input configuration changes directly to controller 403. The description that certain transitions take place "on command" to change configuration should not be taken to limit configuration changes to those that are initiated by a host, but might include "commands" generated by the controller itself, a user, or by some other method.

Figure 8:
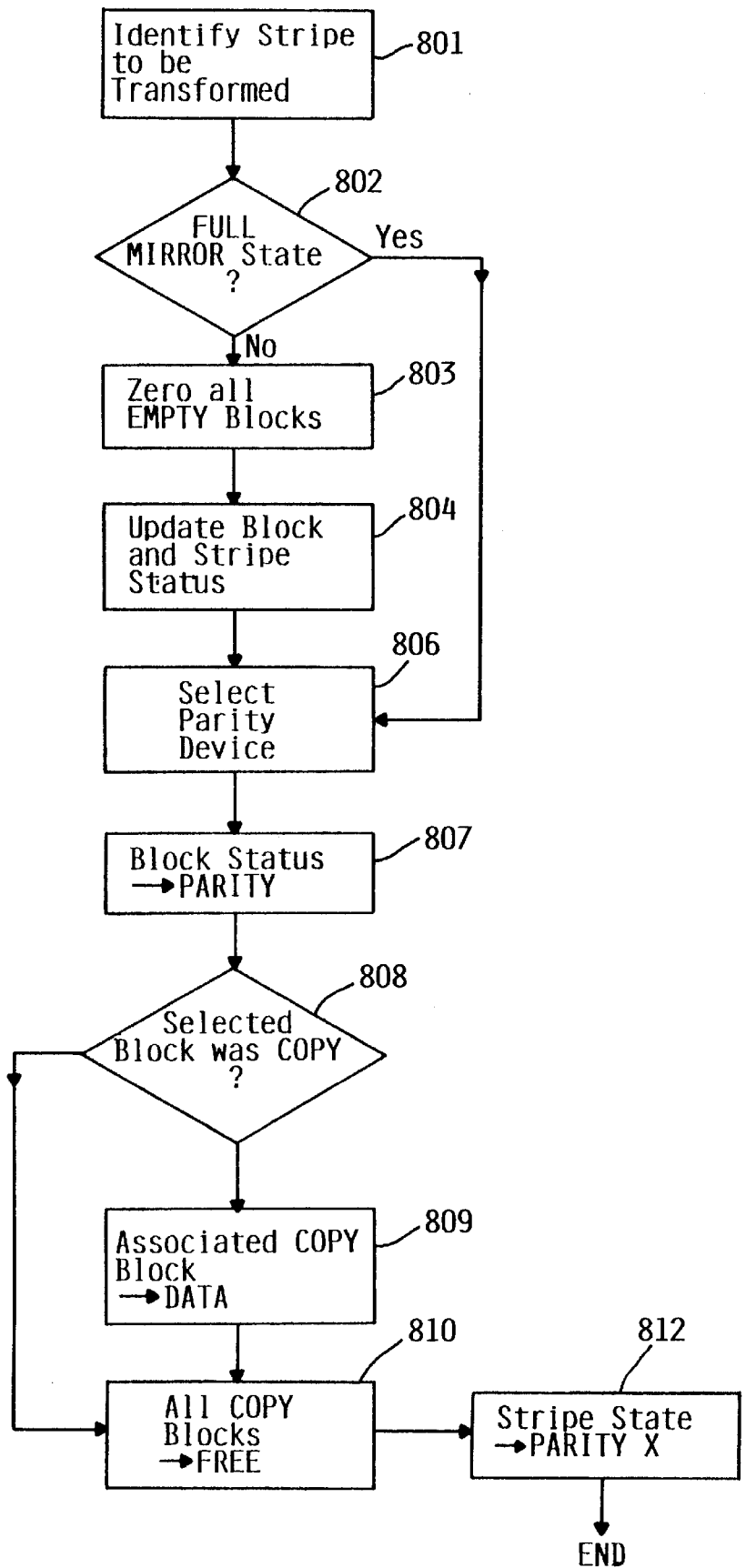
FIG. 8 is a flowchart of the steps performed to transform a portion of the array which is currently formatted as a mirrored structure (RAID-1) into a parity protected structure (RAID-4 or -5), in accordance with one embodiment of the present invention.
Figure 9:
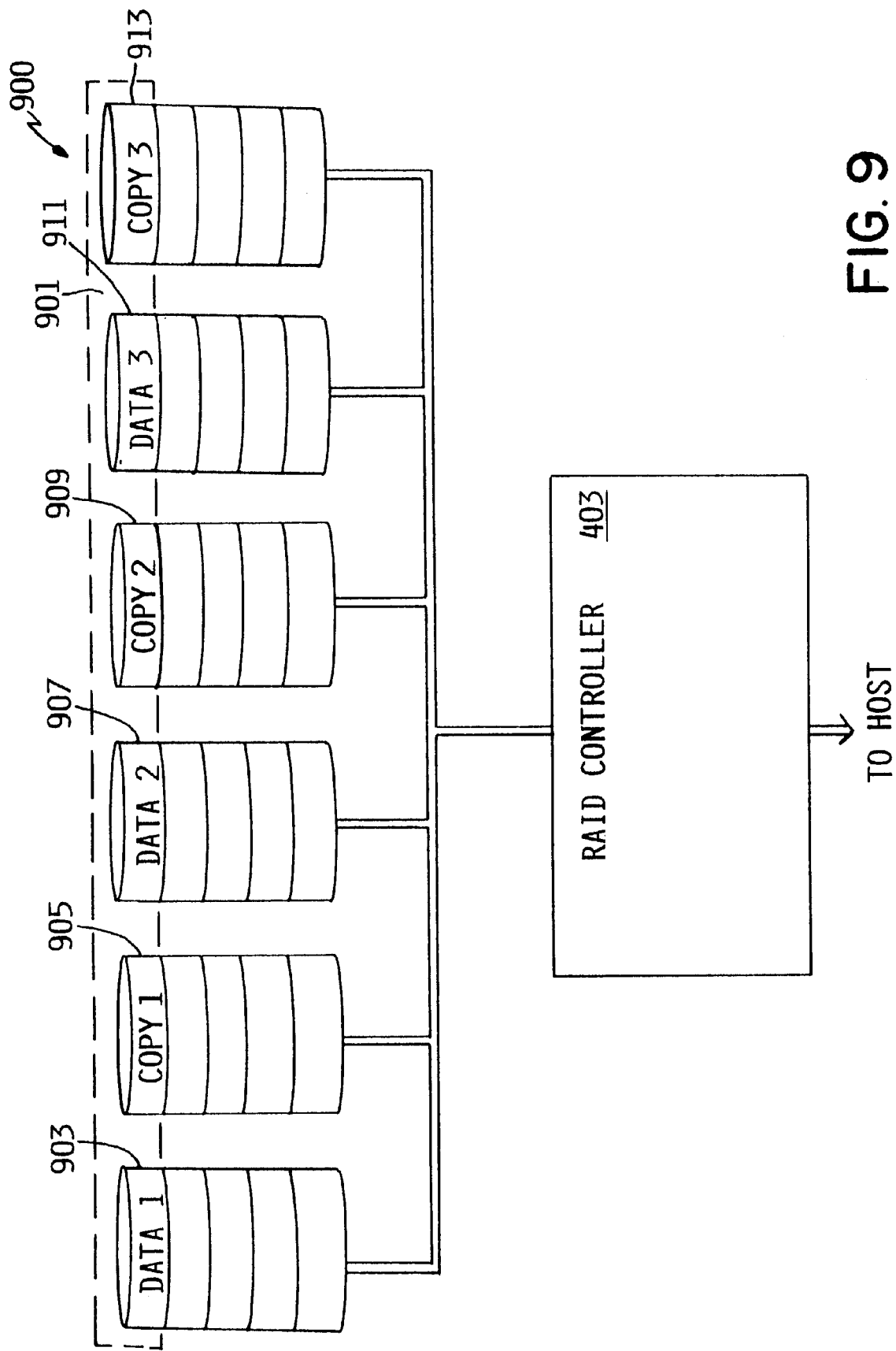
FIG. 9 is an illustration of an array 900 in which one stripe 901 is formatted as a RAID-1 structure, according to the preferred embodiment.
Figure 10:
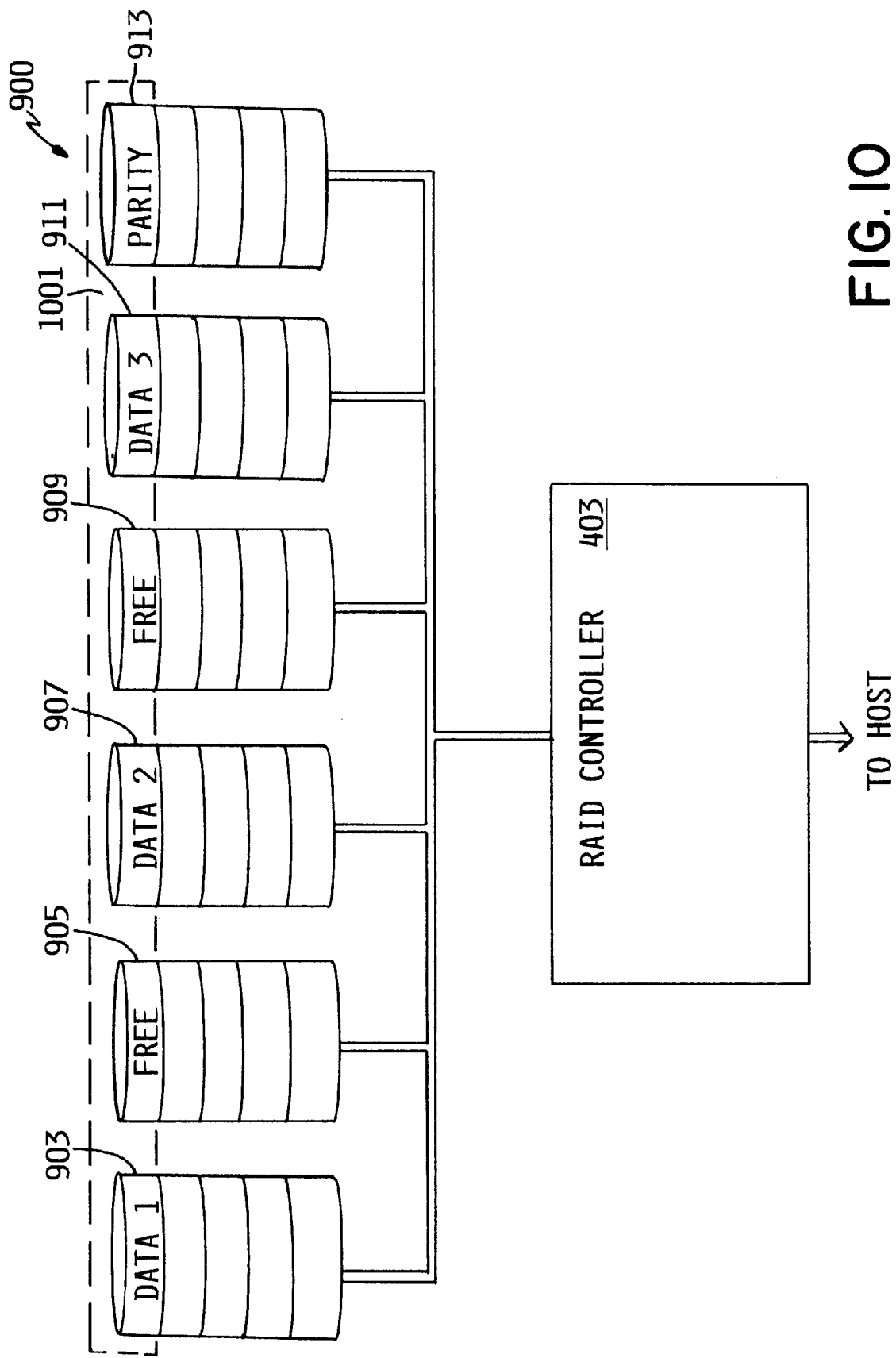
FIG. 10 is an illustration of the array of FIG. 9 after the stripe which is configured as a RAID-1 structure in FIG. 9 has been transformed into parity protected stripe, according to the preferred embodiment.

FIG. 8 is a flowchart of the steps taken to transform a portion of the array which is currently formatted as a RAID-1 structure into a RAID-4 (5) structure in accordance with the preferred embodiment. In other words, the state of a stripe changes from state 2 to state 3 (or in two stages from state 1 to state 2 to state 3). In this embodiment, the array comprises an even number of storage devices, and a stripe comprises one block of each storage device, each block of a stripe being located in the same address range of each respective storage device. FIG. 9 is an illustration of an array 900 for practicing the method of FIG. 8. It should be noted that information which is formatted in accordance with RAID-1 is not commonly stored in a stripe. That is, information organized in accordance with RAID-1 merely requires that a copy of the information reside in another storage device somewhere within the array. In contrast, in accordance with the present invention, blocks of data within a RAID-1 memory structure are designated as forming a "stripe" which has the same dimensions as a RAID-4 or RAID-5 stripes into which the stripe may be converted. It should be noted that blocks of data within a stripe are preferably stored within different DASDs at addresses that are related, such as at the same address within each DASD with respect to the first block of data stored therein. However, in another embodiment of the present invention, each block of data within a stripe may be stored at addresses that is unrelated to the addresses of the other blocks of data. For the sake of notational brevity, a stripe will be noted as being a "RAID-4 (5)" stripe in cases in which the stripe may be either a RAID-4 or a RAID-5 stripe. FIG. 10 is an illustration of the array 900 after the stripe 901, which is configured as a RAID-1 stripe shown in FIG. 9, has been transformed into RAID-4 (5) stripe 1001. The present invention takes advantage of the following observation. A block of data which is XORed with itself will result in a block of all zeros. That is:

$$(A) \; XOR \; (A) = 0 \qquad (EQ\ 1)$$

Since a RAID-1 stripe in the example of FIGS. 9 and 10 comprises three pairs of blocks, each pair including a block of data and a copy of that data block, the result of an XOR operation between any five of the blocks would result in a block which is equal to the sixth block. That is:

$$(A)\ XOR\ (A')\ XOR\ (B)\ XOR\ (B')\ XOR\ (C')=(C') \qquad (EQ\ 2)$$

where A' is an exact copy of A, B' is an exact copy of B, and C' is an exact copy of C.

This relationship would hold true regardless of which five blocks are XORed, assuming that two of the five are copies of two others of the five. Therefore, by merely changing the designation of one block 913 of a RAID-1 stripe from COPY to PARITY, and changing the designation of each of the other COPY blocks 905, 909 to FREE, the RAID-1 stripe is transformed into a RAID-4 (5) stripe, as shown in FIG. 10. It can be seen that the selection of the particular block which is to be designated as the PARITY block will determine whether the stripe will be configured as a RAID-4 or a RAID-5 stripe. It will be clear that there is no distinction between a single RAID-4 or RAID-5 stripe standing on its own, since it is the relative location of the PARITY blocks in each stripe that distinguishes a RAID-4 from a RAID-5 system.

As shown in FIG. 8, the first step in the transformation is to identify a set of blocks to be transformed (STEP 801). In the preferred embodiment, each stripe can be individually and independently transformed from a RAID-1 configuration to a RAID-4 (5) configuration, or the reverse. Because each stripe preferably comprises all the blocks located at a certain address range on each DASD, a stripe is selected simply by designating the address range or by designating one of the blocks. However, the step of identifying a stripe to be transformed could alternatively involve other things. For example, if a stripe comprises blocks at mixed addresses without any relationship to each other, the identification of a stripe might involve selecting the individual pairs of RAID-1 blocks. Alternatively, an array of storage devices might be designed so that only pre-defined groups of stripes can be selected (e.g., a single large address range comprising many blocks), or designed so that the transformation can only be performed on an entire array. The identification may be performed manually by a user, or may be performed by software in accordance with some algorithm (e.g., select least recently used stripe). The transformation algorithm assumes that all pending writes have been completed, i.e., each DATA and its respective COPY block have the same data. This can be verified by checking the version levels. If a write operation has not completed (version levels don't match), the write operation is completed before proceeding.

In accordance with the preferred embodiment, there are two mirrored states, identified as state 1 (NEW MIRROR) and state 2 (FULL MIRROR). A state transition to a parity protected state (state 3, PARITY X) is permitted only from state 2. Therefore, if the stripe is in state 1, it must first be brought to state 2 (transition 1b) to facilitate ultimate transition to the PARITY X state, as shown as the branch at STEP 802. To bring a stripe in the NEW MIRROR state to FULL MIRROR, the EMPTY blocks must be mirrored, i.e., whatever is stored in an EMPTY block must be mirrored in another EMPTY block. If it is known in advance that the EMPTY blocks contain all zeroes, then this is already the case. Otherwise, the easiest way to accomplish this is typically to zero the EMPTY blocks (alternatively, they can be paired with each other and copies of the data made) (STEP 803). The status of the EMPTY blocks is then changed to FREE, and the state of the stripe is changed to FULL MIRROR (STEP 804).

With the stripe in state 2 (FULL MIRROR), one DASD is then selected to store the parity block associated with the new RAID-4 (5) stripe (STEP 806). In FIGS. 9 and 10, block 913 is shown as selected by way of example, it being understood that other blocks might have been selected. In the preferred embodiment, controller 403 selects a parity block automatically in accordance with a pre-defined mapping algorithm for parity blocks. I.e., in the preferred embodiment, parity is configured according to RAID-5, and the number of the parity device is determined by a simple round-robin formula, such as ((N−1)*S MOD N)+1, where S is the stripe number and N is the number of storage devices in the array. However, it will be understood that the selection of an appropriate parity block could alternatively be performed by the user, by the host, or may be implied by some other criterion. For example, if a RAID-4 is designated, the DASD to contain parity may already be known, and hence the block containing parity is known from the identification of the stripe. It may also be that the parity block is selected first, and that the appropriate stripe is implied from the selection of the parity block. Thus, steps 801–806 may be performed in different order, or certain steps may be performed simultaneously.

The block 913 selected for storing parity data is designated as the PARITY block (STEP 807). By "designating", it should be understood that some record is made within the system that this is a parity block, so that henceforth the system will recognize and treat it as such. In the preferred embodiment, the block status in block status field 525 of block table 521 is updated to reflect that the selected block is a parity block, i.e., the status of the block in table 521 is changed to PARITY.

If the block that has been designated as the PARITY block 913 was previously a DATA block (STEP 808), then the COPY block associated with that DATA block is designated as a DATA block (STEP 809). Each remaining COPY block is then designated as a FREE block (STEP 810). Finally, the designation of the stripe is changed from FULL MIRROR (state 2) to PARITY X (state 3) (STEP 812). As explained above, "designating" in the preferred embodiment means changing the block's status in block table 521 and stripe's state in stripe state table 501, it being understood that this information could be represented in other forms.

It can be seen from equation EQ 2 that the information that is stored within the PARITY block 913 will be equal to the logical exclusive-OR of each of the other blocks 903–911 within the stripe 1001, hence it is not necessary to compute parity by successive exclusive-OR operations. Furthermore, since two blocks 905, 909 are designated to FREE, additional information may be stored in the stripe 1001 after conversion from RAID-1 to RAID-4 (5).

Figure 11:
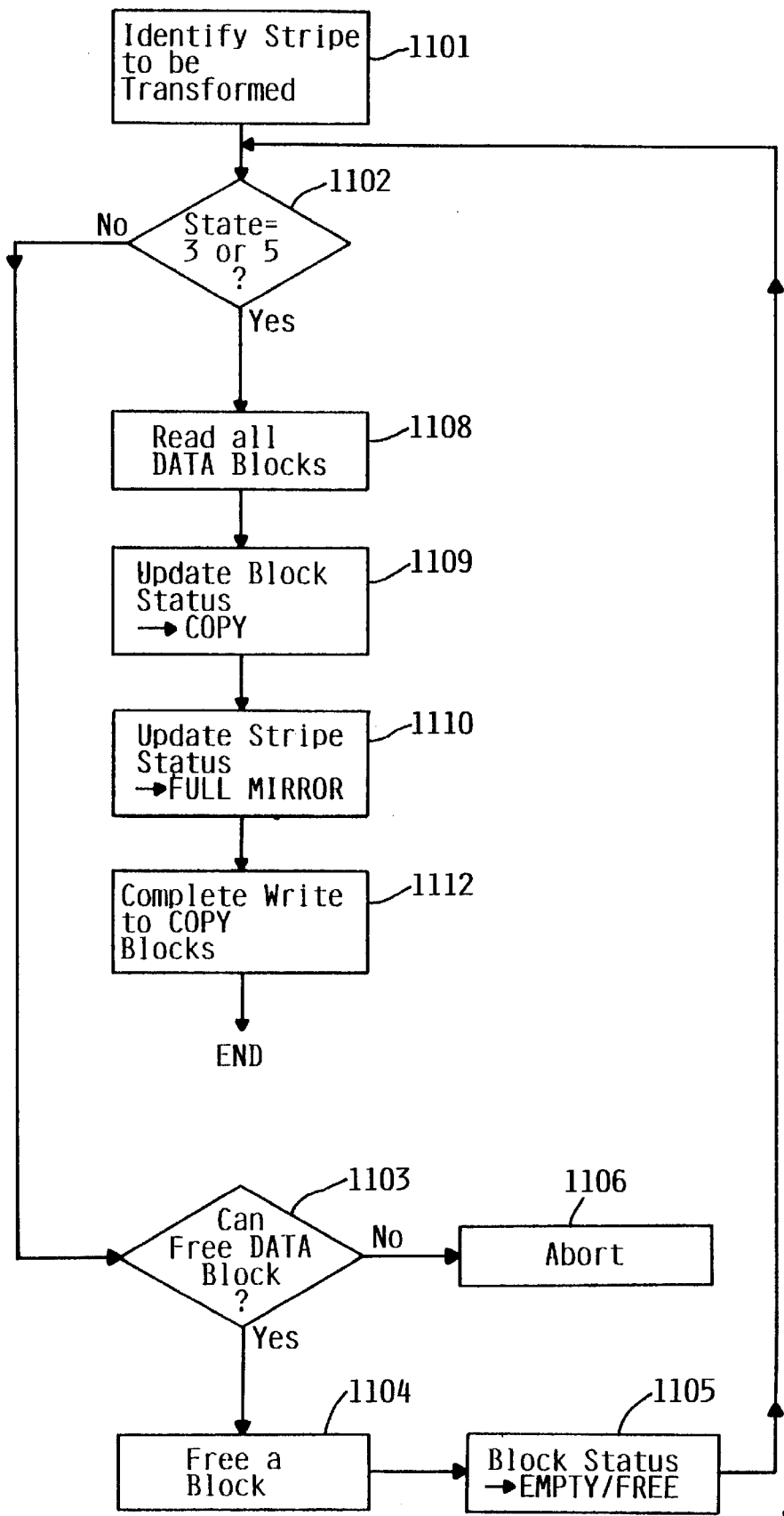
FIG. 11 is a flowchart which illustrates the method by which a parity protected stripe (RAID-4 or -5) is converted to a mirrored structure (RAID-1), according to the preferred embodiment.

FIG. 11 is a flowchart which illustrates the method by which a parity protected or non-redundant stripe (i.e., the "conversion stripe") is converted to a mirrored stripe (RAID-1). In order to convert a stripe to the fully mirrored state, there must be sufficient space available within the conversion stripe to store copies of each of the DATA blocks. Specifically in terms of the state diagram of FIG. 7, a state transition is possible from either state 3 (PARITY X) or state 5 (UNPROTECTED X) to state 2 (FULL MIRROR). These are transitions 3d and 5b shown in FIG. 7. FIG. 10 shows a conversion stripe 1001 in the PARITY X state, which can be converted to the FULL MIRROR state. If the stripe is in states 4, 6 or 7, it must first be brought into either state 3 or 5 before it can be fully mirrored, as explained below. Accordingly, when storing information within a parity protected or unprotected stripe, it is preferable to fill a first block within a first DASD before storing any information in a second block within a second DASD. In this way, information will be consolidated, and will not have to be consolidated in a separate action in order to try to make the necessary space available.

As shown in FIG. 11, the first step in the transformation is to identify the set of blocks to be transformed, i.e., the conversion stripe (STEP 1101). As noted previously, in the preferred embodiment each stripe can be individually and independently transformed from one configuration to another. The stripe can be identified by any of the methods described above with respect to FIG. 8.

The system then verifies whether sufficient unused space exists in the stripe to create a COPY block for each DATA block. Specifically, controller 403 consults stripe state table 501 to determine the stripe state; a stripe in either state 3 or 5 has sufficient unused space (STEP 1102). If insufficient space exists within the conversion stripe to store the required COPY blocks (i.e., the stripe is in state 4, 6, or 7), then at least some of the data must be relocated from the conversion stripe to another stripe or another storage subsystem, such as to associated tape drive 405 (see FIG. 4). This process is shown in FIG. 11 as steps 1103–1106. The system first makes a determination whether storage in a DATA block can be freed (STEP 1103). This could be performed, e.g., by asking a user whether the data in the block can be overwritten, compressed, or stored elsewhere, in which case the user would make the choice. Alternatively, controller 403 can be programmed to scan the other stripes for available blocks to which data can be relocated, to compress data which can be compressed, or to select blocks for relocation to tape, etc., thus relocating blocks automatically. Controller 403 might use an algorithm such as least recently used to determine which block(s) to compress and/or relocate. If it is not possible to free one of the DATA blocks, the process aborts and the conversion stripe is not converted (STEP 1106). If a suitable candidate block is found, the data in the block is relocated/compressed/ignored as appropriate, and the block itself is freed for storage of additional data (STEP 1104). Controller 403 changes the status of the block in status table 521 to FREE (if the stripe is in state 4, FULL PARITY) or to EMPTY (if the stripe is in state 6 or 7, UNPROTECTED or FULL, UNPROTECTED), and updates stripe status (STEP 1105). The change in block status may trigger a change in stripe status to either state 3 or 5. The algorithm then repeats step 1102.

If the stripe is already in state 3 or 5, or can be converted to either state as described above (the "yes" branch from step 1102), controller 403 first reads all DATA blocks in the stripe into RAM 410 (STEP 1108). As the DATA blocks are read into RAM 410, they are enqueued as write operations which have partially completed, i.e., the DATA has been written, but not the COPY. Controller 403 updates block table 521 by changing the status of the EMPTY, FREE, and PARITY blocks to COPY, and placing appropriate entries in the paired device fields 527 (STEP 1109). Only after the blocks are read into RAM and block status mapped is the status of the stripe changed to FULL MIRROR (STEP 1110). Controller 403 then completes the enqueued operations by writing the data from RAM to the COPY blocks (STEP 1112). In this manner, a stripe being converted from parity protected state to a mirrored state remains redundant in the event that one of the DASDs should fail while the conversion is in progress.

Figure 12:
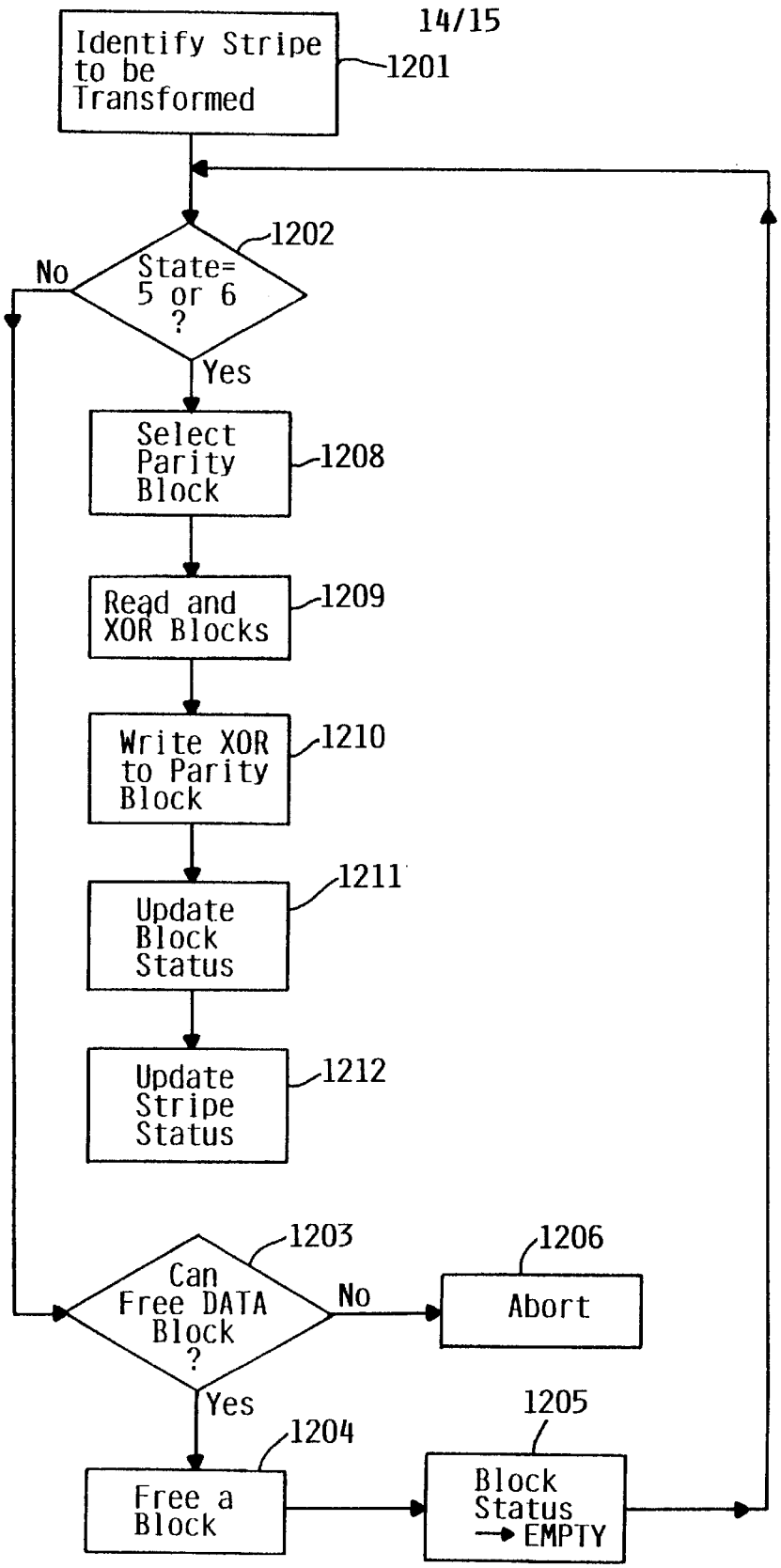
FIG. 12 is a flowchart which illustrates the method by which a non-redundant stripe is converted to a parity protected stripe (RAID-4 or -5), according to the preferred embodiment.

FIG. 12 is a flowchart which illustrates the method by which a non-redundant stripe (i.e., the "conversion stripe") is converted to a parity protected stripe (RAID-4 or -5). In order to convert a stripe to a parity protected state, there must be one unused block available within the conversion stripe to store parity. Specifically in terms of the state diagram of FIG. 7, a state transition is possible from either state 5 (UNPROTECTED X) to state 3 (PARITY X), or from state 6 (UNPROTECTED) to state 4 (FULL PARITY). These are transitions 5c and 6c shown in FIG. 7. If the stripe is in state 7, it must first be brought into state 6 before it can be parity protected, as explained below.

Steps 1201 through 1206 are analogous to steps 1101–1106, described above. As shown in FIG. 12, the first step in the transformation is to identify the set of blocks to be transformed, i.e., the conversion stripe (STEP 1201). As noted previously, stripes are individually configurable, and may be identified by any of the methods described above with respect to FIG. 8.

The system then verifies whether an unused block exists in the stripe for storing parity. Specifically, controller 403 consults stripe slate table 501 to determine the stripe state; a stripe in either state 5 or 6 has sufficient unused space (STEP 1002). If insufficient space exists within the conversion stripe to store the required PARITY block (i.e., the stripe is in state 7), then one block of data must be freed, as described above with respect to FIG. 11. The system determines whether storage in a DATA block can be freed (STEP 1203); if not, the process aborts (STEP 1206). If a suitable candidate block is found, the data in the block is relocated/compressed/ignored as appropriate, and the block itself is freed for storage of additional data (STEP 1204). Controller 403 changes the status of the block in status table 521 to EMPTY, and updates stripe status (STEP 1205). The creation of an EMPTY block causes stripe status to change from state 7 to state 6. The algorithm then repeats step 1202.

If the stripe is already in state 5 or 6, or can be converted to state 6 as described above (the "yes" branch from step 1202), controller 403 first selects a block for storing parity (STEP 1208). This might be done by any of the methods described above with respect to FIG. 8. However, if a DATA block is chosen, the data in the block would have to be relocated to one of the EMPTY blocks. Therefore, it is preferable to choose an available EMPTY block. If more than one EMPTY block exists, a suitable algorithm could select such an EMPTY block. Controller then successively reads all blocks in the stripe, other than the block chosen for storage of parity, and generates a cumulative exclusive-OR of the blocks read (STEP 1209). This cumulative exclusive-OR is temporarily stored in RAM 410. When all blocks have been read, the resulting cumulative exclusive-OR is the parity. This parity is then written to the selected PARITY block (STEP 1210). Controller 403 then updates block status table 521 by changing the status of the parity block to PARITY, changing the status of any EMPTY block to FREE, and updating paired device field 527 as appropriate (STEP 1211). Controller then changes the status of the stripe in table 501 to PARITY X or FULL PARITY, as appropriate (STEP 1212). The version numbers are also set to reflect that parity is current.

Figure 13:
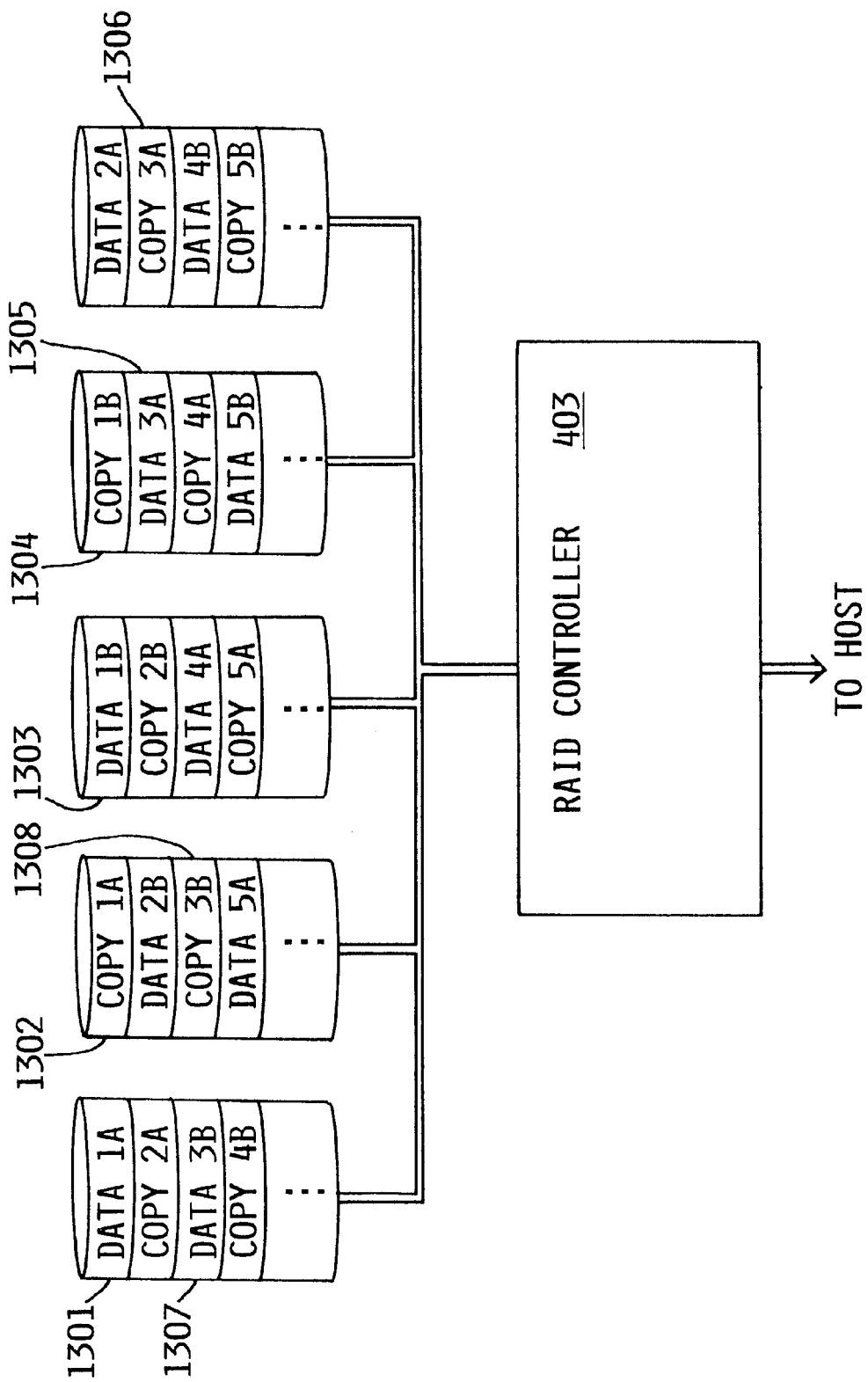
FIG. 13 is an illustration of an array having an odd number of storage devices, according to an alternative embodiment of the present invention.

In the preferred embodiment, the number of storage devices in the array is even, and each stripe comprises all the blocks at a particular address range on each respective storage device. This arrangement simplifies the mapping of stripes and determination of parity blocks. However, it is possible to use an array having an odd number of storage devices. In this case, a stripe preferably comprises some even number of blocks, less than the number of storage devices. E.g., the number of blocks in a stripe can be N−1, where N is the number of storage devices. Such a configuration is shown in FIG. 13. In the array of FIG. 13, the blocks labelled DATA 1A, COPY 1A, DATA 1B and COPY 1B (1301–1304) constitute a stripe, while e.g., blocks labelled DATA 3A, COPY 3A, DATA 3B and COPY 3B(1305–1308) constitute a second stripe. It will be noted that each stripe contains an even number of blocks, but the blocks are not all at the same address. Such a stripe can be converted to a RAID-4 (5) format and back again using the techniques described above. Some modification of the data directory tables may be necessary to handle the more complicated mapping of stripes.

Alternatively, a stripe containing an odd number of blocks can be converted from a RAID-1 to a RAID-4 (5) using a modification of the above described technique, if one of the blocks is known to be EMPTY and contains all zeroes (if the contents of an EMPTY block are unknown or not zero, zeroes can be written to the block to put it in proper condition). This might be the case, e.g., where a new DASD is added to an existing array. In this case, a stripe selected to contain one or more pairs of blocks configured according to RAID-1 and an empty block can be converted to RAID-4 (5) by (a) selecting a parity block (which may be the empty block) and designating it as a PARITY block, (b) if the selected block was a COPY block, designating every other COPY block and the EMPTY block as FREE; (c) if the selected block was a DATA block, designating the associated COPY block as a DATA block, and designating all other COPY blocks and the EMPTY block as FREE; and (d) if the selected block was the EMPTY block, designating every COPY block as FREE. It is similarly possible to convert back to RAID-1, with one block left unpaired (either as a FREE block or as a DATA block which is unprotected against failure of the storage device).

In accordance with the preferred embodiment of the present invention, designation of a block as FREE, COPY, DATA, or EMPTY is performed by a RAID controller. The RAID controller may be a programmable device, such as an IBM SSA RAID Adapter for PC Servers, a PC ServeRAID SCSI Adapter, or a Disk Unit Controller within an AS/400 Advanced System Model 300, each of which are manufactured and distributed by International Business Machines Corporation. Alternatively, the controller may be a state machine, dedicated hardware, or an ASIC (application specific integrated circuit). Alternatively, the functions performed by a dedicated RAID controller of a storage subsystem may be performed by software executing on a general-purpose central processing unit of a computer system, the central processing unit performing numerous other tasks in addition to RAID controller function.

The particular designation of each block is performed in accordance with the preferred embodiment in order to determine whether new data can be written to the block, and if so, whether the new data must be written in accordance with a read-modify-write algorithm. It will be understood by those skilled in the art that other designations could be used to achieve similar results, and that the designation of each block may also be used for other purposes unrelated to the present invention.

A control program for an array of storage devices may be embodied as a sequence of processor-executable instructions stored on a computer program product, such as a magnetic floppy disk, magnetic tape, optical disk, integrated circuit chip, or other storage or memory device which can be read by a programmable computer.

In accordance with the preferred embodiment, a set of blocks of a RAID-1 configuration may be converted to a RAID-4 or RAID-5 configuration, or vice versa. However, it should be understood that other configurations having similar characteristics may be used, regardless of RAID level or other designation. In particular, some in the industry recognize RAID levels of 6 or higher. Usually, such systems have all the characteristics of RAID levels 4 or 5, but have additional features as well, such as dual parity blocks or additional spare blocks.

FIGS. 1, 2, 3, 9, 10 and 13 illustrate arrays of storage devices, in which each device contains a relatively small number of blocks. The small number is chosen for ease of illustration only, and should not be taken to limit the invention to any particular number. While it is possible to practice the present invention using a small number of blocks, it will be understood by those skilled in the art that most arrays of storage devices in fact have a much larger number of blocks in each storage device.

While the particular system and method for converting a stripe in accordance with one format into a stripe conforming to another format as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A method for converting a first memory structure stored on a plurality of data storage devices to a second memory structure stored on said plurality of data storage devices, the method comprising the steps of:

(a) identifying a set of blocks of data to be converted, each block of said set being stored on a different respective one of said plurality of data storage devices, said set comprising a plurality of pairs of blocks, both blocks of each respective pair containing identical data;

(b) selecting a first block of said set;

(c) designating the first block as a parity block without altering data contained in said first block;

(d) selecting a respective block from each pair of blocks of said set which does not include said first block; and (e) designating each respective block selected from each pair of blocks of said set which does not include said first block as available for storage of replacement data.

2. The method for converting a first memory structure to a second memory structure of claim 1, wherein said set of blocks comprises a stripe in which each respective block is stored at the same address on its respective data storage device.

3. The method for converting a first memory structure to a second memory structure of claim 1, wherein each said data storage device stores a plurality of said blocks, said plurality of data storage devices containing a plurality of said sets of blocks; and wherein a first set of blocks of data may be converted from said first memory structure to said second memory structure while a second set of blocks remains configured according to said first memory structure.

4. The method for converting a first memory structure to a second memory structure of claim 3, wherein each set of blocks may be individually and independently converted from said first memory structure to said second memory structure.

5. The method for converting a first memory structure to a second memory structure of claim 1, wherein said first memory structure is a set of blocks configured according to RAID-1 and wherein said second memory structure is a set a blocks configured according to one of the set consisting of RAID-4 and RAID-5.

6. The method for converting a first memory structure to a second memory structure of claim 1,
   wherein the first memory structure comprises a plurality of COPY blocks and DATA blocks, each COPY block being a copy of an associated DATA block and each COPY block being stored on a different DASD from the DASD on which the associated DATA block is stored, the second memory structure comprising a parity block and a set of parity protected blocks, each parity protected block being stored on a different DASD from the parity block and from each other parity protected block;
   wherein if said first block is a COPY block, then said step of designating each respective block selected from each pair of blocks of said set which does not include said first block available for storage of replacement data comprises designating each other COPY block a FREE block; and
   wherein if said first block is a DATA block, then said step of designating each respective block selected from a pair of blocks of said set which does not include said first block available for storage of replacement data comprises (1) designating the COPY block associated with the first block as a DATA block, and (2) designating each other COPY block as a FREE block.

7. The method for converting a first memory structure to a second memory structure of claim 1, wherein said data storage devices are rotating magnetic hard disk drives.

8. A data storage system, comprising:
   a plurality of data storage devices;
   a programmable processor for controlling the operation of said plurality of data storage devices, said programmable processor executing a control program for converting a first memory structure stored on said plurality of storage devices to a second memory structure stored on said plurality of storage devices;
   wherein said control program maintains status information for said data storage system; and
   wherein said control program, in response to identification of a set of blocks of data to be converted, each block of said set to be converted being stored on a different respective one of said plurality of data storage devices, said set comprising a plurality of pairs of blocks, both blocks of each respective pair containing identical data,
   (a) updates said status information to designate a first block of said set of blocks as a parity block, without altering data contained in said first block, and
   (b) updates said status information to designate a respective block from each pair of blocks of said set which does not include said first block as available for storage of replacement data.

9. The data storage system of claim 8, wherein said programmable processor is contained in a controller for attaching to a host computer system, said controller including a random access memory for containing said status information.

10. The data storage system of claim 8, wherein said first memory structure is a set of blocks configured according to RAID-1 and wherein said second memory structure is a set a blocks configured according to one of the set consisting of RAID-4 and RAID-5.

11. The data storage system of claim 8, wherein said data storage devices are rotating magnetic hard disk drives.

12. The data storage system of claim 8, wherein said set of blocks comprises a stripe in which each respective block is stored at the same address on its respective data storage device.

13. The data storage system of claim 8,
   wherein each said data storage device stores a plurality of said blocks, said plurality of data storage devices containing a plurality of said sets of blocks; and
   wherein said control program converts a first set of blocks of data from said first memory structure to said second memory structure while a second set of blocks remains configured according to said first memory structure.

14. The data storage system of claim 13, wherein said control program is capable of converting each set of blocks individually and independently from said first memory structure to said second memory structure.

15. The data storage system of claim 8, wherein said control program automatically selects said first block in response to identification of a set of blocks of data to be converted from said first memory structure to said second memory structure.

16. A controller for controlling a data storage system, said data storage system having a plurality of data storage devices for storing data, said controller comprising:
   a programmable processor for controlling the operation of said plurality of data storage devices, said programmable processor executing a control program for converting a first memory structure stored on said plurality of storage devices to a second memory structure stored on said plurality of storage devices; and
   a random access memory for containing status information maintained by said control program;
   wherein said control program, in response to identification of a set of blocks of data to be converted, each block of said set to be converted being stored on a different respective one of said plurality of data storage devices, said set comprising a plurality of pairs of blocks, both blocks of each respective pair containing identical data,
   (a) updates said status information to designate a first block of said set of blocks as a parity block, without altering data contained in said first block, and
   (b) updates said status information to designate a respective block from each pair of blocks of said set which does not include said first block as available for storage of replacement data.

17. The controller for controlling a data storage system of claim 16, wherein said first memory structure is a set of blocks configured according to RAID-1 and wherein said second memory structure is a set a blocks configured according to one of the set consisting of RAID-4 and RAID-5.

18. The controller for controlling a data storage system of claim 16,
   wherein each said data storage device stores a plurality of said blocks, said plurality of data storage devices containing a plurality of said sets of blocks; and
   wherein said control program converts a first set of blocks of data from said first memory structure to said second memory structure while a second set of blocks remains configured according to said first memory structure.

19. The controller for controlling a data storage system of claim 18, wherein said control program is capable of converting each set of blocks individually and independently from said first memory structure to said second memory structure.

20. A program storage device readable by a digital processing apparatus and tangibly embodying a control program of instructions executable by the digital processing apparatus for controlling a data storage system, said data storage system having a plurality of data storage devices for storing data, said program performing method steps for converting a first memory structure into a second memory structure, the method steps comprising:

(a) receiving the identification of a set of blocks of data to be converted from said first memory structure to said second memory structure, each block of said set to be converted being stored on a different respective one of said plurality of data storage devices, said set comprising a plurality of pairs of blocks, both blocks of each respective pair containing identical data;

(b) updating status information to designate a first block of said set of blocks as a parity block without altering data contained in said first block; and (c) updating said status information to designate a respective block from each pair of blocks of said set which does not include said first block as available for storage of replacement data.

21. The program storage device of claim 20, wherein said first memory structure is a set of blocks configured according to RAID-1 and wherein said second memory structure is a set a blocks configured according to one of the set consisting of RAID-4 and RAID-5.

22. The program storage device of claim 20, wherein each said data storage device stores a plurality of said blocks, said plurality of data storage devices containing a plurality of said sets of blocks; and wherein said control program converts a first set of blocks of data from said first memory structure to said second memory structure while a second set of blocks remains configured according to said first memory structure.

23. A method for converting a first memory structure stored on a plurality of data storage devices to a second memory structure stored on said plurality of data storage devices, the method comprising the steps of:

(a) identifying a set of blocks of data to be converted, each block of said set being stored on a different respective one of said plurality of data storage devices, said set comprising a plurality of blocks containing data and a block containing parity derived from said plurality of blocks containing data;

(b) selecting said block containing parity to contain a copy of data contained in a first of said plurality of blocks containing data, without altering data contained in said first block;

(c) selecting a first subset of said set of blocks of data, said first subset having at least one block of data other than said parity block, to contain a copy of data contained in a second subset of said set of blocks of data, said second subset having at least one block of data other than said first of said plurality of blocks containing data, without altering data contained in said second subset;

(d) copying data contained in said first of said plurality of blocks to said block containing parity; and (e) copying data contained in each block of said second subset to a respective block of said first subset.

24. A data storage system, comprising:

a plurality of data storage devices;

a programmable processor for controlling the operation of said plurality of data storage devices, said programmable processor executing a control program for controlling the operation of said data storage system;

wherein data in said plurality of data storage devices is organized into a plurality of sets of blocks, each block of a set being stored on a different respective one of said plurality of data storage devices;

wherein said control program supports formatting of said sets of blocks according to a plurality of different memory structures, at least one of said memory structures being a redundant data format, a first set of blocks and a second set of blocks being formattable independently of each other; and a random access memory for storing status information maintained by said control program, said status information including a respective block status for each block and a separate respective set status for said first set of blocks and said second set of blocks, said set status information including identification of the memory structure according to which each respective set of blocks is configured;

wherein said control program, in response to identification of a set of blocks of data to be converted from a first memory structure to a second memory structure, at least one of said blocks containing data to be stored in said second memory structure, (a) updates block status information for the blocks of said set of blocks to be converted without altering said data to be stored in said second memory structure, and (b) updates set status information for said set of blocks to identify the set as configured according to the second memory structure.

25. The data storage system of claim 24, wherein said first memory structure is a set of blocks configured according to RAID-1 and wherein said second memory structure is a set a blocks configured according to one of the set consisting of RAID-4 and RAID-5.

26. The data storage system of claim 24, wherein each said set of blocks comprises a stripe in which each respective block is stored at the same address on its respective data storage device.

27. The data storage system of claim 24, wherein said status information includes a separate respective set status for each respective set of said plurality of sets of blocks, each set of blocks of said plurality of sets of blocks being configurable according to a respective memory structure individually and independently from any other set of blocks of said plurality of sets of blocks.

* * * * *

UNITED STATES PATENT AND TRADEMARK OFFICE
CERTIFICATE OF CORRECTION

PATENT NO. : 5,960,169
DATED : September 28, 1999
INVENTOR(S) : David Alan Styczinski It is certified that error appears in the above-identified patent and that said Letters Patent is hereby corrected as shown below:

IN THE ABSTRACT:

Line 12 - "slate" should be --state--.

Signed and Sealed this

Eighteenth Day of April, 2000

*Attest:*

Q. TODD DICKINSON

*Attesting Officer*  *Director of Patents and Trademarks*